US012745144B2

(12) United States Patent
Ramachandra et al.

(10) Patent No.: US 12,745,144 B2
(45) Date of Patent: Sep. 22, 2026

(54) METHODS AND NODES FOR MEASURING A SERVING CELL IN L1/L2-CENTRIC MOBILITY

(71) Applicant: TELEFONAKTIEBOLAGET LM ERICSSON (PUBL), Stockholm (SE)

(72) Inventors: Pradeepa Ramachandra, Linköping (SE); Icaro Leonardo Da Silva, Solna (SE); Helka-Liina Määttänen, Espoo (FI)

(73) Assignee: TELEFONAKTIEBOLAGET LM ERICSSON (PUBL ), Stockholm (SE)

( * ) Notice: Subject to any disclaimer, the term of this patent is extended or adjusted under 35 U.S.C. 154(b) by 630 days.

(21) Appl. No.: 18/030,296

(22) PCT Filed: Oct. 7, 2021

(86) PCT No.: PCT/IB2021/059208
§ 371 (c)(1),
(2) Date: Apr. 5, 2023

(87) PCT Pub. No.: WO2022/074602
PCT Pub. Date: Apr. 14, 2022

(65) Prior Publication Data

US 2024/0397394 A1 Nov. 28, 2024

Related U.S. Application Data

(60) Provisional application No. 63/088,707, filed on Oct. 7, 2020.

(51) Int. Cl.
*H04W 36/00* (2009.01)
*H04B 17/318* (2015.01)

(52) U.S. Cl.
CPC ...... *H04W 36/0085* (2018.08); *H04B 17/328* (2023.05); *H04W 36/0088* (2013.01); *H04W 36/0055* (2013.01)

(58) Field of Classification Search
CPC . H04W 24/10; H04W 76/27; H04W 36/0058; H04W 72/23; H04W 36/0085;
(Continued)

(56) References Cited

U.S. PATENT DOCUMENTS 11,330,453 B2 * 5/2022 da Silva ................ H04W 48/16
11,405,814 B2 * 8/2022 Lee .................. H04W 52/0229
(Continued)

FOREIGN PATENT DOCUMENTS

EP 2911436 B1 1/2019
WO 2020069415 A1 4/2020

OTHER PUBLICATIONS

R1-2006790, Qualcomm Incorporated: "Enhancements on Multi-beam Operation", 3GPP Draft ; 3rd Generation Partnership Project (3GPP), Mobile Competence Centre ; 650,. Route Des Lucioles; F-06921 Sophia-Antipolis Cedex; France ; Aug. 8, 2020; Retrieved from the Internet: URL:https://ftp.3gpp.org/tsg_ran/WG1_RL1/TSGR1_102-e/Docs/RI-2006790.zip RI-2006790.

*Primary Examiner* — Khalid W Shaheed
(74) *Attorney, Agent, or Firm* — Ericsson Inc.

(57) ABSTRACT

There is provided a method in a wireless device configured with multiple Physical Cell Identities (PCIs) for a mobility procedure, wherein the wireless device is configured with one or more cells operating in a same serving frequency, each cell associated with one or more PCIs. The method comprises: selecting a PCI among the multiple PCIs; determining cell measurement results based on cell measurements performed on the selected PCI, wherein the cell measurements represent measurements of a serving cell; and determining whether or not to trigger an event for measurement reporting, based on the cell measurement results. The wireless device may also select a subset of PCIs among the multiples PCIs and determine cell measurement results
(Continued)

based on cell measurements performed based on the selected subset of PCIs.

19 Claims, 8 Drawing Sheets

(58) Field of Classification Search
CPC ............. H04W 48/16; H04W 36/0088; H04W 36/0094; H04W 36/30; H04W 36/304; H04W 56/0065
See application file for complete search history.

(56) References Cited

U.S. PATENT DOCUMENTS

2021/0045170 A1* 2/2021 Luo ........................ H04W 24/02
2022/0200751 A1* 6/2022 He ......................... H04L 5/0048
2024/0031904 A1* 1/2024 Ishii .................... H04W 36/324

* cited by examiner

200

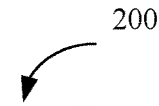

sending a configuration to a wireless device for configuring the wireless device with multiple Physical Cell Identities (PCIs) for a mobility procedure, wherein the wireless device is configured with one or more cells operating in a same serving frequency, each cell being associated with one or more PCIs
210 receiving a report including cell measurements performed based on a PCI selected among the multiple PCIs, wherein the cell measurements represent measurements of a serving cell
220

sending a configuration to a wireless device for configuring the wireless device with multiple Physical Cell Identities (PCIs) for a mobility procedure, wherein the wireless device is configured with one or more cells operating in a same serving frequency, each cell being associated with one or more PCIs
260 receiving a report including cell measurements performed based on a subset of PCIs selected among the multiple PCIs, wherein the cell measurements represent measurements of a serving cell
270

FIG. 12

METHODS AND NODES FOR MEASURING A SERVING CELL IN L1/L2-CENTRIC MOBILITY

RELATED APPLICATIONS

This application claims the benefits of priority of U.S. Provisional Patent Application No. 63/088,707, entitled "L1/L2-centric mobility—serving cell measurements" and filed at the United States Patent and Trademark Office on Oct. 7, 2020, the content of which is incorporated herein by reference.

TECHNICAL FIELD

The present description generally relates to wireless communication systems and more specifically to serving cell measurements in the context of L1/L2-centric mobility.

BACKGROUND

Measurement Model in New Radio (NR)

The measurement model (how the cell level and beam level layer 3 measurements are derived) in NR can be found in Third Generation Partnership Project (3GPP) Technical Specification (TS) 38.300 V16.2.0 (2020 July).

In the RRC_CONNECTED mode, the User Equipment (UE) measures multiple beams (at least one) of a cell and the measurements results (power values) are averaged to derive the cell quality. In doing so, the UE is configured to consider a subset of the detected beams. Filtering takes place at two different levels: at the physical layer (Layer 1 (L1)) to derive beam quality and then at Radio Resource Control (RRC) level to derive cell quality from multiple beams. Cell quality from beam measurements is derived in the same way for the serving cell(s) and for the non-serving cell(s). Measurement reports may contain the measurement results of the X best beams if the UE is configured to do so by the gNB.

The corresponding high-level measurement model is described in FIG. 1, where the different parameters are given as follows:

- A: measurements (beam specific samples) internal to the physical layer.
- Layer 1 filtering: internal layer 1 filtering of the inputs measured at point A. Exact filtering is implementation dependent. How the measurements are actually executed in the physical layer by an implementation (inputs A and Layer 1 filtering) in not constrained by the standard.
- $A^1$: measurements (i.e. beam specific measurements) reported by layer 1 to layer 3 after layer 1 filtering.
- Beam Consolidation/Selection: beam specific measurements are consolidated to derive cell quality. The behaviour of the Beam consolidation/selection is standardised and the configuration of this module is provided by RRC signalling. Reporting period at B equals one measurement period at $A^1$.
- B: a measurement (i.e. cell quality) derived from beam-specific measurements reported to layer 3 after beam consolidation/selection.
- Layer 3 filtering for cell quality: filtering performed on the measurements provided at point B. The behaviour of the Layer 3 filters is standardised and the configuration of the layer 3 filters is provided by RRC signalling. Filtering reporting period at C equals one measurement period at B.
- C: a measurement after processing in the layer 3 filter. The reporting rate is identical to the reporting rate at point B. This measurement is used as input for one or more evaluation of reporting criteria.
- Evaluation of reporting criteria: checks whether actual measurement reporting is necessary at point D. The evaluation can be based on more than one flow of measurements at reference point C, e.g. to compare between different measurements. This is illustrated by input C and $C^1$. The UE shall evaluate the reporting criteria at least every time a new measurement result is reported at point C, $C^1$. The reporting criteria are standardised and the configuration is provided by RRC signalling (UE measurements).
- D: measurement report information (message) sent on the radio interface.
- L3 Beam filtering: filtering performed on the measurements (i.e. beam specific measurements) provided at point $A^1$. The behaviour of the beam filters is standardised and the configuration of the beam filters is provided by RRC signalling. Filtering reporting period at E equals one measurement period at $A^1$.
- E: a measurement (i.e. beam-specific measurement) after processing in the beam filter. The reporting rate is identical to the reporting rate at point $A^1$. This measurement is used as input for selecting the X measurements to be reported.
- Beam Selection for beam reporting: selects the X measurements from the measurements provided at point E. The behaviour of the beam selection is standardised and the configuration of this module is provided by RRC signalling.
- F: beam measurement information included in measurement report (sent) on the radio interface.

It should be noted that K beams correspond to the measurements on Synchronization Signal Block (SSB) or Channel State Information-Reference signal (CSI-RS) resources configured for Layer 3 (L3) mobility by a gNB and detected by the UE at L1.

Layer 1 filtering introduces a certain level of measurement averaging. How and when the UE exactly performs the required measurements is implementation specific to the point that the output at B fulfils the performance requirements set in TS 38.133. Layer 3 filtering for cell quality and related used parameters are specified in TS 38.331 and do not introduce any delay in the sample availability between B and C. Measurement at point C, $C^1$ is the input used in the event evaluation. L3 Beam filtering and related used parameters are specified in TS 38.331 and do not introduce any delay in the sample availability between E and F.

Intra-frequency neighbour (cell) measurements and inter-frequency neighbour (cell) measurements are defined as follows:

- A measurement is defined as an SSB based intra-frequency measurement provided that the center frequency of the SSB of the serving cell and the center frequency of the SSB of the neighbour cell are the same, and the subcarrier spacing of the two SSBs is also the same.
- A measurement is defined as an SSB based inter-frequency measurement provided that the center frequency of the SSB of the serving cell and the center frequency of the SSB of the neighbour cell are different, or the subcarrier spacing of the two SSBs is different.

NOTE: For SSB based measurements, one measurement object corresponds to one SSB and the UE considers different SSBs as different cells.

A measurement is defined as a CSI-RS based intra-frequency measurement provided that the bandwidth of the CSI-RS resource on the neighbour cell configured for measurement is within the bandwidth of the CSI-RS resource on the serving cell configured for measurement, and the subcarrier spacing of the two CSI-RS resources is the same.

A measurement is defined as a CSI-RS based inter-frequency measurement provided that the bandwidth of the CSI-RS resource on the neighbour cell configured for measurement is not within the bandwidth of the CSI-RS resource on the serving cell configured for measurement, or the subcarrier spacing of the two CSI-RS resources is different.

Procedure for Serving Cell Measurements in NR

The measurement procedures distinguish the following types of cells:

The NR serving cell(s): these are the Special Cell (SpCell) and one or more Secondary Cells (SCell)s.

Listed cells: these are cells listed within the measurement object(s).

Detected cells: these are cells that are not listed within the measurement object(s) but are detected by the UE on the SSB frequency(ies) and subcarrier spacing(s) indicated by the measurement object(s).

In this disclosure, the NR serving cells are the most relevant. As defined above, serving cells comprise the SpCell, which is the Primary Cell (in case the UE is not in Multi-Radio Dual Connectivity). The PCell is the cell the UE connects to, e.g. during connection setup and/or resume. A UE in RRC_IDLE or RRC_INACTIVE, before it performs a state transition, is camping on a cell. When upper layers request the setup or resume of a connection, the UE performs a random access in that cell and in the normal case it enters RRC_CONNECTED and considers that cell to be the PCell, as specified in 3GPP TS 38.331 V16.2.0 (2020 July).

The PCell configuration is partially provided in system information (cell-specific parameters, e.g. in ServingCellConfigCommon in SIB1), including the Physical Cell Identifier (PCI), which is found in the field physCellld of the Information Element (IE) PhysCellld, of the cell that is considered to be the PCell, as provided in TS 38.331 v.16.2.0.

The frequency information for the serving cell (i.e. the SSB Absolute Radio Frequency Channel Number (ARFCN)) is provided in DownlinkConfigCommon of TS 38.331 v.16.2.0.

The PCIs are encoded in the primary synchronization signal (PSS) and secondary synchronization signal (SSS) as part of the SS/Physical Broadcast Channel (PBCH) Block (SSB), as defined in TS 38.212. Then, measurements per SSB and CSI-RS for a given PCI are provided in more details in TS 38.215, such as the following SSB-based measurements:

SS reference signal received power (SS-RSRP);

SS reference signal received quality (SS-RSRQ);

SS reference signal received quality (SS-signal-to-noise-plus-interference ratio (SINR)).

SS-RSRP, for example, is defined as the linear average over the power contributions of the resource elements that carry secondary synchronization signals. SS-RSRP shall be measured only among the reference signals corresponding to SS/PBCH blocks with the same SS/PBCH block index and the same physical-layer cell identity. If SS-RSRP is not used for L1-RSRP and higher-layers indicate certain SS/PBCH blocks for performing SS-RSRP measurements, then SS-RSRP is measured only from the indicated set of SS/PBCH block(s).

SS-RSRQ is defined as the ratio of N×SS-RSRP/NR carrier Received Signal Strength Indicator (RSSI), where N is the number of resource blocks in the NR carrier RSSI measurement bandwidth. The measurements in the numerator and denominator shall be made over the same set of resource blocks. In other words, as SS-RSRQ is computed based on SS-RSRP, it shall also be measured only among the reference signals corresponding to SS/PBCH blocks with the same SS/PBCH block index and the same physical-layer cell identity.

SS-SINR is defined as the linear average over the power contribution of the resource elements carrying secondary synchronization signals divided by the linear average of the noise and interference power contribution. If SS-SINR is not used for L1-SINR and higher-layers indicate certain SS/PBCH blocks for performing SS-SINR measurements, then SS-SINR is measured only from the indicated set of SS/PBCH block(s).

In the NR measurement model, it was said that a UE in RRC_CONNECTED measures multiple beams (at least one) of a cell and the measurements results (power values) are averaged to derive the cell quality. The "beam" measurement can be interpreted as measurements of an SSB, performed for SSBs with the same PCI and the same SSB index. As stated in 3GPP TS 38.300, an SSB consists of primary and secondary synchronization signals (PSS, SSS), each occupying 1 symbol and 127 subcarriers, and PBCH spanning across 3 orthogonal frequency-division multiplexing (OFDM) symbols and 240 subcarriers, but on one symbol leaving an unused part in the middle for SSS as shown in FIG. 2. The possible time locations of SSBs within a half-frame are determined by sub-carrier spacing, and the periodicity of the half-frames where SSBs are transmitted is configured by the network. During a half-frame, different SSBs may be transmitted in different spatial directions (i.e. using different beams, spanning the coverage area of a cell).

When an SSB is associated with a Remaining Minimum System Information (RMSI), the SSB corresponds to an individual cell, which has a unique NR Cell Global Identity (NCGI). Such an SSB is referred to as a Cell-Defining SSB (CD-SSB). A PCell is always associated with a CD-SSB located on the synchronization raster.

Cell Quality Derivation (CQD) of Serving Cells in RRC and its Usage

An NR UE in RRC_CONNECTED is required to perform serving cell measurements. An RRC procedure for serving cell measurements has been defined for that. The purpose is to enable the network to configure the UE with measurement events (e.g. A3) wherein the serving cell quality (e.g. RSRP, RSRQ, SINR) is compared with an absolute threshold and/or with the quality of another neighbour cell (for possibly triggering an inter-frequency/intra-frequency handover—called in NR an Master Cell Group (MCG) reconfiguration with sync). The procedure is defined in TS 38.331, v16.2.0.

SUMMARY

There are some challenges and problems with the existing solutions.

In Release (Rel)-17, 3GPP is going to standardize what is called so far L1/L2 centric inter-cell mobility (or L1-mobility, inter-PCI Transmission Configuration Indicator (TCI) state change/update/modification, etc.). This is justified in the Work Item Description (WID) RP-193133 (Further enhancements on MIMO for NR) by the fact that while Rel-16 manages to offer some reduction in overhead and/or latency, high-speed vehicular scenarios (e.g. a UE traveling at high speed on highways) at FR2 require more aggressive reduction in latency and overhead—not only for intra-cell, but also for L1/L2 centric inter-cell mobility. That translates in the following objective:

1. Enhancement on multi-beam operation, mainly targeting FR2 while also applicable to FR1:
   a. Identify and specify features to facilitate more efficient (lower latency and overhead) DL/UL (uplink) beam management to support higher intra- and L1/L2-centric inter-cell mobility and/or a larger number of configured TCI states:
      i. Common beam for data and control transmission/reception for DL and UL, especially for intra-band Carrier Aggregation (CA);
      ii. Unified TCI framework for DL and UL beam indication;
      iii. Enhancement on signaling mechanisms for the above features to improve latency and efficiency with more usage of dynamic control signaling (as opposed to RRC).
   b. Identify and specify features to facilitate UL beam selection for UEs equipped with multiple panels, considering UL coverage loss mitigation due to Maximum Permissible Exposure (MPE), based on UL beam indication with the unified TCI framework for UL fast panel selection.

Even though 3GPP has not decided how a L1/L2 inter-cell centric mobility should be standardized, the understanding for the purpose of the disclosure is that the UE receives a L1/L2 signaling (instead of RRC signaling) indicating a TCI state (e.g. for Physical Downlink Control Channel (PDCCH)) possibly associated with an SSB whose PCI is not necessarily the same as the PCI of the cell the UE has connected to, e.g. via connection resume or connection establishment, as shown in FIG. 3. In other words, in this disclosure, the L1/L2-centric inter-cell mobility procedure can be interpreted as a beam management operation expanding the coverage of multiple SSBs associated to multiple PCIs (e.g. possibly associated to the same cell or different cells).

A capable UE for L1 mobility within an area covered by a set of PCIs, e.g. PCI-1, PCI-2, PCI-3, PCI-4, can rely on beam management procedures, i.e. L1 measurements/reporting and Medium Access Control (MAC) Control Element (CE)/DCI indications (or any other lower layer signaling like in Radio Link Control (RLC), MAC or Physical (PHY) layers in the protocol stack). However, within a network, this area will not most likely be an "infinite" area, i.e. at some point, the UE will leave that area and should be able to move to an area (e.g. a cell) possibly not supporting L1/L2 inter-cell centric mobility, as shown in FIG. 4. Such a scenario can lead to some problems.

A first problem may be as follows: the introduction of L1/L2-centric inter-cell mobility will leave some coverage areas within the network that do not support L1/L2-centric inter-cell mobility. Currently, it is not clear how that could be supported, i.e. a UE capable of performing L1/L2-centric inter-cell mobility in a first area, moving away from that area, would first trigger a radio link failure (RLF) and then initiate a re-establishment procedure in the new area, which creates some disruption in the performance.

Another problem addressed herein concerns how the UE performs Radio Resource Management (RRM) serving cell measurements to assist the network to perform mobility from the area supporting L1/L2 centric mobility to an area (e.g. a cell) not supporting L1/L2 centric mobility. This is problematic because existing serving cell measurements are performed based on a 1-to-1 association between a PCI and a serving cell (each serving cell has its own PCI, at least a Cell-defining SSB), while in L1/L2 centric mobility that relation may not exist, e.g. a serving cell may possibly be associated with multiple PCIs for L1/L2 centric mobility. Note: RRM measurements are usually the measurements triggering measurement events (A1 to A6, B1 and/or B2), L3 filtered and included in an RRC measurement report.

For example, FIG. 3 illustrates an intra-frequency deployment scenario, with four different PCIs. The L1 based mobility is supported within the area covered by PCI-1, PCI-2 and PCI-3. For example, the UE performs serving PCI changes at T2 (from PCI-1 to PCI-2), at T3 (from PCI-2 to PCI-3), at T4 (from PCI-3 to PCI-1) and at T5 (from PCI-1 to PCI-4). Here are some problems with this scenario as an example.

Problem 1—Notion of the Serving Cell Pre and Post L1 Based Serving PCI Change When the UE is connected in PCI-1 at T1, the UE receives the measurement configuration for measurement reporting, e.g. to assist the network to perform RRC-based mobility (e.g. requiring a reconfiguration with sync). The UE with a measConfig is required to perform serving cell measurements.

From a Rel-15 or Rel-16 NR UE point of view, there is only one PCI associated with a serving cell and performing serving cell measurements (e.g. for the evaluation of measurement events) does not have ambiguities. For example, at T1, the serving cell measurements are based on PCI-1 and, at T2, after the RRC driven handover from PCI-1 to PCI-2, the serving cell measurements are based on PCI-2, etc.

However, when a change of PCI is triggered by the lower layers (e.g. L1/L2 centric mobility, like a MAC CE indicating a TCI state associated to PCI-2, while the UE is monitoring a PDCCH associated to a TCI state associated to PCI-1), it is unclear how the UE performs RRM measurements corresponding to the serving cell. If the UE does not change the serving cell measurements, i.e., the UE continues to treat the PCI-1 based measurements as serving cell measurements, the serving cell quality could get very bad as the UE is served by another PCI and thus could result in radio link failure, re-establishment, etc.

Problem 2—Multiple Unnecessary Measurement Reporting to RRC

When the UE is served by PCI-1, the UE receives measurement configuration for intra frequency measurements, for example, to enable intra frequency mobility. Such an RRM event configuration in this L1 based mobility scenario generates RRC measurement reports at the following instances:

1) The UE generates an event triggered measurement report at T2 when the PCI-2 based measurement quantity becomes better than the PCI-1 based measurement quantity by a certain offset.
2) The UE generates an event triggered measurement report at T3 when the PCI-3 based measurement quantity becomes better than the PCI-2 based measurement quantity by a certain offset.

3) The UE generates an event triggered measurement report at T4 when the PCI-1 based measurement quantity becomes better than the PCI-3 based measurement quantity by a certain offset.

4) The UE generates an event triggered measurement report at T5 when the PCI-4 based measurement quantity becomes better than the PCI-1 based measurement quantity by a certain offset.

Of all these events, only the measurement at T5 is of interest for RRC as the mobility decision based on this event is supposed to be taken by RRC and the rest of the measurement reports generated at T2, T3 and T4 are of no interest (at least from the mobility decisions point of view) to RRC, as the mobility decisions at these instances are taken by the lower layers. Therefore, the current solutions result in unnecessary RRC measurement reporting overhead.

This disclosure comprises methods for a UE for performing measurements of a configured serving cell (e.g. serving cell measurements, SpCell measurements, PCell measurements, RSRP measurements for the PCell, RSRQ measurements for the PCell, etc.) when the UE is configured with multiple PCI(s) for L1/L2-centric mobility, and the UE reporting at least one of the serving cell measurements performed accordingly. The method comprises how the UE performs Cell Quality Derivation for serving cells in L1/L2-centric mobility, for example.

The disclosure also comprises methods for a network node for configuring a UE for performing measurements of at least one configured serving cell for the UE configured with multiple PCI(s) for L1/L2-centric mobility, and receiving from the UE a reporting of at least one of the serving cell measurements performed accordingly. The methods comprise the network node making decisions based on the received measurements, e.g. handover, reconfiguration with sync with the PCell, etc. The methods comprise how the network node configures the UE for performing Cell Quality Derivation for serving cells in L1/L2-centric mobility.

According to an aspect, some embodiments include methods performed by a wireless device, configured with multiple PCIs for a mobility procedure, wherein the wireless device is configured with one or more cells operating in a same serving frequency, each cell associated with one or more PCIs. A method may comprise: selecting a PCI among the multiple PCIs; determining cell measurement results based on cell measurements performed on the selected PCI, wherein the cell measurements represent measurements of a serving cell; and determining whether or not to trigger an event for measurement reporting, based on the cell measurement results.

Another method in a wireless device configured as above may comprise: selecting a subset of PCIs among the multiple PCIs; determining cell measurement results based on cell measurements performed on the selected subset of PCIs, wherein the cell measurements represent measurements of a serving cell; and determining whether or not to trigger an event for measurement reporting, based on the cell measurement results.

According to another aspect, a wireless device configured to perform one or more functionalities (e.g. actions, operations, steps, etc.) as described herein is provided.

According to another aspect, some embodiments include methods performed by a network node. A method may comprise: sending a configuration to a wireless device for configuring the wireless device with multiple PCIs for a mobility procedure, wherein the wireless device is configured with one or more cells operating in a same serving frequency, each cell being associated with one or more PCIs; and receiving a report including cell measurements performed based on a PCI selected among the multiple PCIs, wherein the cell measurements represent measurements of a serving cell.

Another method may comprise: sending a configuration to a wireless device for configuring the wireless device with multiple PCIs for a mobility procedure, wherein the wireless device is configured with one or more cells operating in a same serving frequency, each cell being associated with one or more PCIs; and receiving a report including cell measurements performed based on a subset of PCIs selected among the multiple PCIs, wherein the cell measurements represent measurements of a serving cell.

According to yet another aspect, a network node configured to perform one or more functionalities (e.g. actions, operations, steps, etc.) as described herein is provided.

In some embodiments, the network node and the wireless device may comprise one or more communication interfaces configured to communicate with one or more other radio nodes and/or with one or more network nodes, and processing circuitry operatively connected to the communication interface, the processing circuitry being configured to perform one or more functionalities as described herein. In some embodiments, the processing circuitry may comprise at least one processor and at least one memory storing instructions which, upon being executed by the processor, configure the at least one processor to perform one or more functionalities as described herein.

According to yet another aspect, some embodiments include a non-transitory computer-readable medium storing a computer program product comprising instructions which, upon being executed by processing circuitry (e.g., at least one processor) of the network node, configure the processing circuitry to perform one or more functionalities as described herein.

The advantages/technical benefits of the embodiments of the present disclosure are:

Using the above methods, the UE is able to perform CQD for a serving cell for which the UE is configured with L1/L2-centric mobility, even though the UE may be configured with multiple PCIs from which the UE can move around with L1/L2 signaling.

The advantage of enabling that is to make possible for the UE to compare its serving cell quality (e.g. serving cells RSRP, RSRQ, SINR) with the quality of other cells (e.g. neighbour cells RSRP, RSRQ, SINR), so that when an event becomes fulfilled, the UE transmits a measurement report including these measurements to indicate to the network that L3 mobility (i.e. RRC based, inter-cell mobility, reconfiguration with sync) should be performed; and/or to trigger the network to configure inter-frequency measurements (e.g. in case an A2 event for serving cell measurements is being configured); and/or to enable the UE to have serving cell measurements available in case the UE needs to include serving cell measurements in a failure report (MCG failure report, Secondary Cell Group (SCG) failure report, RLF report, etc.).

The proposed solutions/methods enable mobility between the cells in the area within which L1/L2 centric mobility is enabled and the cells that are area outside.

This summary is not an extensive overview of all contemplated embodiments and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which:

FIGS. 11 and 12 are flow charts of a method in a network node, in accordance with an embodiment.

DETAILED DESCRIPTION

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes," and/or "including" when used herein, specify the presence of stated features, integers, steps, operations, elements, and/or components, but do not preclude the presence or addition of one or more other features, integers, steps, operations, elements, components, and/or groups thereof.

Disclaimers

The term "beam" is used to refer to SSB or layer 3 configured CSI-RS in the disclosure.

Figure 1:
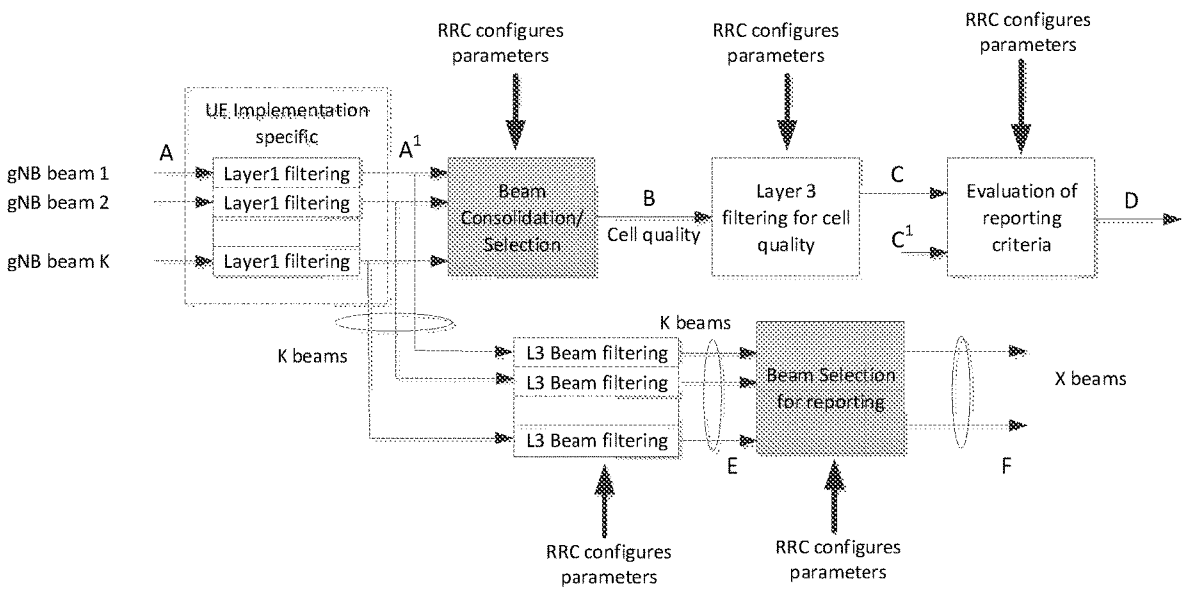
FIG. 1 illustrates an example of a measurement model in NR.
Figure 2:
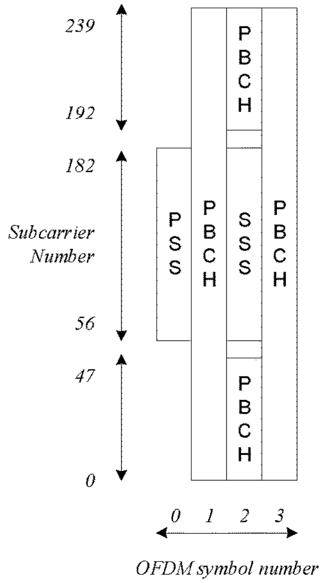
FIG. 2 illustrates an example of an SSB.
Figure 3:
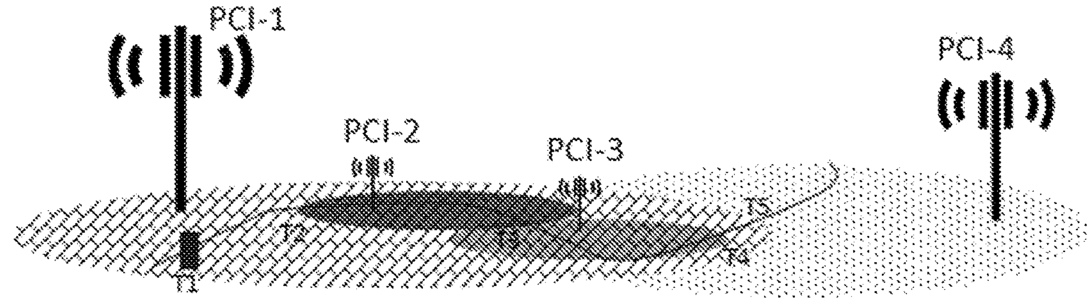
FIG. 3 illustrates an example of a network coverage/area covered by different PCIs.
Figure 4:
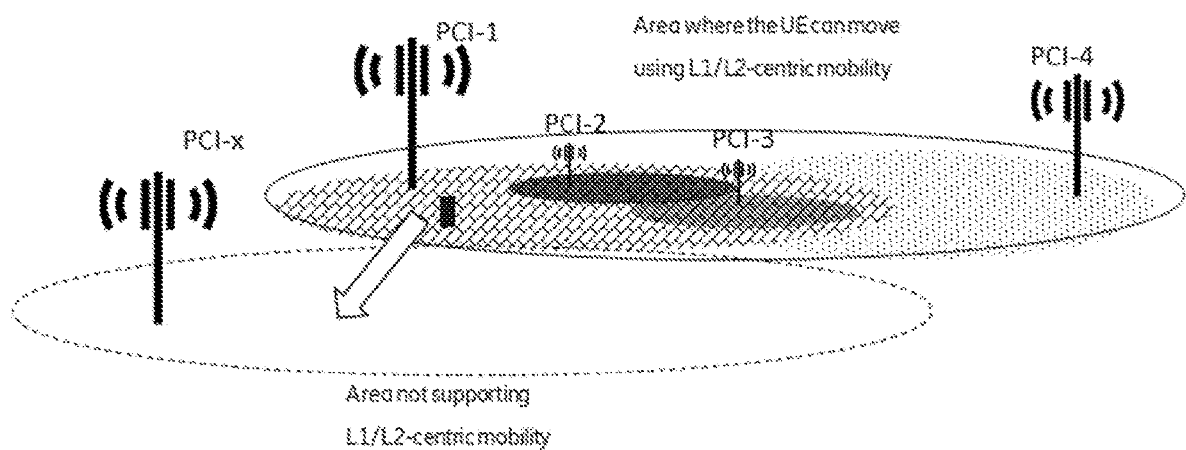
FIG. 4 illustrates an example of a UE moving to an area not covered by L1/L2-centric mobility.

The disclosure refers to the term "L1/L2 inter-cell centric mobility" as used in the WID in 3GPP, though it interchangeably also uses the terms L1/L2 mobility, L1-mobility or L1/L2-centric mobility. As shown in FIG. 3, a UE in RRC_CONNECTED is connected (i.e. being served by) to a serving cell, e.g. the PCell, after performing connection setup (if transitioning from RRC_IDLE to RRC_CONNECTED, or connection resume (if transitioning from RRC_INACTIVE to RRC_CONNECTED, with the UE having a first PCI associated to the PCell, i.e. the PCI in ServingCellConfigCommon/SIB1, which refers to the cell the UE camped on, when it performed the random access for the transition to RRC_CONNECTED (e.g. denoted as PCI-1). In the multi-beam scenario, a cell can be associated to multiple SSBs, and during a half-frame, different SSBs may be transmitted in different spatial directions.

One example of this first PCI associated with the PCell can be the PCI in the field phyCellId of IE PhysCellId in ServingCellConfigCommon (e.g. transmitted in SIB1 and acquired by the UE before the UE performs random access) in TS 38.331 v.16.2.0.

For L1/L2 inter-cell centric mobility, the UE is also configured with additional PCIs (e.g. PCI-2, PCI-3, PCI-4), wherein each additional PCI, or equivalently stated, any SSB beam related to the additional PCI, can be used as a Quasi-Co-Location (QCL) source in a TCI state the UE is configured with.

In the prior art, the UE assumes that the QCL source of a TCI state is a Reference Signal (RS) associated to the serving cell's first PCI (i.e. the PCI in ServingCellConfigCommon). In this disclosure, the UE can be configured with a different PCI (SSB of a different PCI) in the TCI state configuration. An example where simply another PCI is added to the TCI state is shown below:

```
-- ASN1START
-- TAG-TCI-STATE-START
TCI-State ::=     SEQUENCE {
   tci-StateId        TCI-StateId,
   qcl-Type1          QCL-Info,
   qcl-Type2          QCL-Info
OPTIONAL,   -- Need R
   ...
}
QCL-Info ::=      SEQUENCE {
   cell               ServCellIndex      OPTIONAL,   -- Need R
   phyCellId          PhysCellId         OPTIONAL,   -- Need R
   bwp-Id             BWP-Id
[...]
```

| QCL-Info field descriptions |
|---|
| bwp-Id<br>The DL BWP which the RS is located in. |
| cell<br>The UE's serving cell in which the referenceSignal is configured. If the field is absent, it applies to the serving cell in which the TCI-State is configured. The RS can be located on a serving cell other than the serving cell in which the TCI-State is configured only if the qcl-Type is configured as typeC or typeD. See TS 38.214 [19] clause 5.1.5. |
| referenceSignal<br>Reference signal with which quasi-collocation information is provided as specified in TS 38.214 [19] subclause 5.1.5. |
| phyCellId<br>Physical cell identity associated to the reference signal configured as QCL source. |
| qcl-Type<br>QCL type as specified in TS 38.214 [19] subclause 5.1.5. |

One possible solution for this signaling is that the absence of phyCellId indicates to the UE that the PCI to be assumed is the PCI included in ServingCellConfigCommon, for that configured TCI state.

Even though the term "L1/L2 inter-cell centric mobility" has the term "inter-cell", a fundamental aspect is that a serving cell configuration has more than one PCI associated to it. There are at least 2 approaches to create that association:

Approach 1) Intra-cell multi-PCI L1/L2 centric mobility, where a same serving cell configuration is associated to more than one PCI.

Approach 2) Inter-cell multi-PCI L1/L2 centric mobility, where a UE has several serving cell configurations with respective PCIs associated to but a TCI state may refer to other serving cell PCIs.

Approach 1) Intra-Cell Multi-PCI L1/L2 Centric Mobility

In the prior art, the UE can receive a MAC CE from the network to indicate the TCI state to be associated to a given PDCCH configuration, while PDSCH TCI state association can be provided via Downlink Control Indication (DCI). Upon reception, the UE knows which TCI state (e.g. in which downlink beam PDCCH is being transmitted and should be monitored/received) is associated to a given PDCCH configured to be monitored. In other words, in a system where SS/PBCH Blocks (SSB)s are transmitted in different beams for a given cell with a given PCI, a TCI indication for a given PDCCH configurations triggers the UE to monitor PDCCH in a given beam of that cell associated to its PCI, i.e. a beam/SSB of the serving cell where that TCI state is configured.

However, according to the methods in this disclosure, for a given serving cell configuration, there can be a different PCI in a TCI state configuration compared to the PCI in ServingCellConfigCommon (e.g. PCI-1), which is an additional PCI (e.g. PCI-2). In that case, the UE receiving the MAC CE needs to determine the PCI associated with the indicated TCI, to determine the associated SSB (or CSI-RS), hence, to determine the downlink beam. If it receives a TCI with PCI indicating PCI-2, the UE needs to monitor PDCCH in a beam/SSB associated with PCI-2.

The problem is that even though the UE is still considered to be in the same Serving Cell, as there has been no handover, reconfiguration with sync or cell reselection, the UE has been indicated a TCI for PDCCH associated with one of the additional PCIs (e.g. PCI-2); hence, the UE may not even be in the coverage area of PCI-1 indicated in ServingCellConfigCommon. Hence, as serving cell measurements are performed based on a 1-to-1 relation between a serving cell and its associated PCI, it becomes unclear how serving cell measurements for that PCell are performed.

In a first example of Approach 1, the ServingCellConfigCommon before and after the TCI state indication associated to a PCI different than the one in ServingCellConfigCommon remains the same, except for the PCI; hence, the UE is still assumed to be in the same cell after the TCI state indication (e.g. MAC CE) whose TCI state has a different PCI associated to it (not necessarily signaled in the MAC CE, as the TCI state identifier in the MAC CE enables the UE to identify the associated PCI). This case can be referred to as "same cell, change PCI, similar ServingCellConfigCommon".

In a second example of Approach 1, the UE is configured with some PCI-specific configurations. In other words, the UE has a ServingCellConfigCommon, valid for the PCI indicated on it, but it contains some further PCI-specific configurations so that upon receiving an indication for a different PCI, the UE switches configurations. An example of the signaling is shown below:

```
-- Serving cell specific MAC and PHY parameters for a SpCell:
SpCellConfig ::=                SEQUENCE {
  servCellIndex                 ServCellIndex
OPTIONAL,   -- Cond SCG
  reconfigurationWithSync       ReconfigurationWithSync
OPTIONAL,   -- Cond ReconfWithSync
  rlf-TimersAndConstants        SetupRelease { RLF-TimersAndConstants }
OPTIONAL,   -- Need M
rlmInSyncOutOfSyncThreshold     ENUMERATED {n1}
OPTIONAL,   -- Need S
  spCellConfigDedicated         ServingCellConfig
OPTIONAL,   -- Need M
  addMod-PCI-ConfigList       SEQUENCE (SIZE (1..maxNrofAdditionalPCIs)) OF AddModPCI
  remove-PCI-ConfigList       SEQUENCE (SIZE (1..maxNrofAdditionalPCIs)) OF
ServCellIndex
AddModPCI ::=                   SEQUENCE {
  Add-PCIIndex                  ServCellIndex,
  Add-PCIIndex                  ServingCellConfigCommon
  Smtc                          SSB-MTC
  ...
}
```

In this example, the UE may apply the new ServingCellConfigCommon (for the new PCI in the MAC CE) on top of the previous ServingCellConfigCommon, e.g. in a delta-signaling manner. That reduces the amount of signaling for the PCI-specific configurations, in case some of the configurations are the same. This case can be referred to as "Same cell, change PCI, ServingCellConfigCommon has some PCI-specific configuration(s)".

Another way to configure the UE is to configure the UE with SSB sets that have other PCI associated to them, in the serving cell configuration. These SSB sets would have an index. In TCI state configuration, an index of a SSB set is indicated, in combination with an exact SSB beam index from that SSB set. It is possible these sets will be named differently to reflect "inter PCI candidates", thus a SSB set index is an example of an RRC configuration specific ID given to the PCI (SSB set) to be used in the L1/L2 mobility in the UE's current RRC configuration.

Approach 2) Inter-Cell Multi-PCI L1/L2 Centric Mobility

In the prior art, the UE assumes that the QCL source of a configured TCI state is a RS associated to the serving cell's single configured PCI (i.e. the PCI in ServingCellConfigCommon). However, in this second approach, the UE can be configured with a different PCI in the TCI state configuration, wherein different PCIs are considered to be associated with different TCI state configurations; that is, the UE has different serving cell configurations for these PCIs.

In other words, the UE is configured with a list of TCI states, meaning that it is configured with a list of additional cells, as the different PCIs are PCIs of different cells (each TCI state has its own PCI, but the same PCI may be used by multiple TCI states). These could be considered as some kind of serving cells, e.g. if these are all in the same frequency (like same ARFCN for their SSB), these could be considered as intra-frequency serving cells, where one is considered to be active at the time (except if some form of multi-Transmission Reception Point (mTRP) transmission is enabled).

Regardless of which approach (2 or 1) is considered, the problem still remains: the UE may move between PCI(s) (either associated to the same cell, as in approach 1, or different cells, as in approach 2) and, when moving within that area, the UE should be able to compute its serving cell quality.

Note that what is called "changing cell" or "inter-cell" herein does not have the same meaning as changing serving cell as in legacy.

The methods described in this disclosure refer most of the time to the problem of mobility, i.e. when the UE is transmitting/receiving from one so-called source cell and triggers a procedure to start transmitting/receiving from another cell so-called target cell. However, many aspects of the methods are also applicable for mTRP transmissions, where the UE may be connected simultaneously to multiple cells/PCI(s). In that case, instead of changing from one cell to another, the UE would add/remove (activate/deactivate) a cell using lower layer signaling (i.e. signaling in a protocol layer below RRC, like Packet Data Convergence Protocol (PDCP), RLC, MAC or PHY signaling). The term L1/L2 inter-cell centric mobility is often used in the disclosure to refer to this feature.

Different alternatives with different advantages, depending on the scenarios and architectural assumptions, are disclosed in the disclosure. All solutions have in common the fact that they comprise the UE receiving a set of configurations from the network (e.g. PDCCH and PDSCH configurations and associated TCI states) to enable mobility using more signaling efficiently and fast lower layer signaling, i.e. the UE changes from a TCI state associated to one PCI (e.g. of a cell) to a TCI state associated to another PCI (e.g. possibly from another cell).

The disclosure also refers to L1/L2 signaling and MAC CEs sometimes interchangeably. MAC CE is indeed an example to be considered for L1/L2 signaling for L1/L2-centric inter-cell mobility. However, the methods are not limited to that. Another example of L1/L2 signaling for L1/L2-centric inter-cell is DCI, which may also indicate a TCI state (that may be mapped to a PCI, hence may also be used for mobility).

The terminology of 5G NR and its specifications (such as 3GPP TS 38.331, TS 38.321, TS 38.215) is used. However, that should not be interpreted as a limiting factor. In fact, the methods may be applicable to any Radio Access Technology (RAT) where the concept of TCI states (or equivalently beam-based mobility) is applicable.

The serving cell measurements may comprise at least RSRP and/or RSRQ and/or SINR performed on reference signals (e.g. SSBs associated to a serving cell), e.g. SpCell measurements, PCell measurements, when the UE is configured with multiple PCI(s).

Now, some embodiments will be described. The embodiments may comprise methods for a UE for performing CQD of at least one configured serving cell (e.g. serving cell measurements, SpCell measurements, PCell measurements, RSRP measurements for the PCell, RSRQ measurements for the PCell, etc.) when the UE is configured with multiple PCI(s) for L1/L2-centric mobility, and the UE reporting at least one of the serving cell measurements performed accordingly.

In one embodiment, the UE configured with L1/L2-centric mobility performs serving cell measurements (i.e. RRM measurements on a serving cell, such as L3 filtered cell-based RSRP and/or RSRQ and/or SINR to be used as input for measurements events for measurement reporting). That can be configured with an RRC Reconfiguration message (e.g. an RRCReconfiguration) received upon the transition to RRC_CONNECTED. That message may also include a measurement configuration (field measConfig of IE MeasConfig as defined in RRC specification) including parameters for the UE to perform RRM measurements, monitor the trigger of events (e.g. A1, A2, A3, A4, A5, A6, B1, B2) and information on what to include in measurement reports to be transmitted, e.g. upon fulfilment of event trigger conditions. Different cases will be considered, in which the UE may select a specific PCI or a subset of PCIs, as described below.

Case 1: Use Initial PCI

In this case, even if the UE is configured with a serving cell associated with multiple PCI(s), where each PCI may be associated with a TCI state configuration that may be indicated via L1/L2 signalling (e.g. a MAC CE for TCI state indication for UE-specific PDCCH), the UE performs serving cell measurements based on the initial PCI, the initial PCI being the PCI within ServingCellConfigCommon obtained when the UE had entered the connected state, for example.

In one option, the PCI the UE considers for performing serving cell measurements (e.g. PCell RSRP, PCell RSRQ, PCell SINR, etc.) can be updated so that the UE changes the PCI to use for performing measurements, in at least one of the following cases:

- Upon an MCG reconfiguration with sync and/or during a handover (e.g. upon reception of an RRCReconfiguration message including a reconfiguration with sync for a MCG);
- Upon the receipt of an explicit indication from the network (e.g. upon receipt of an RRCReconfiguration message including an indication for the UE to change the PCI to use for serving cell measurements).

Figure 5:
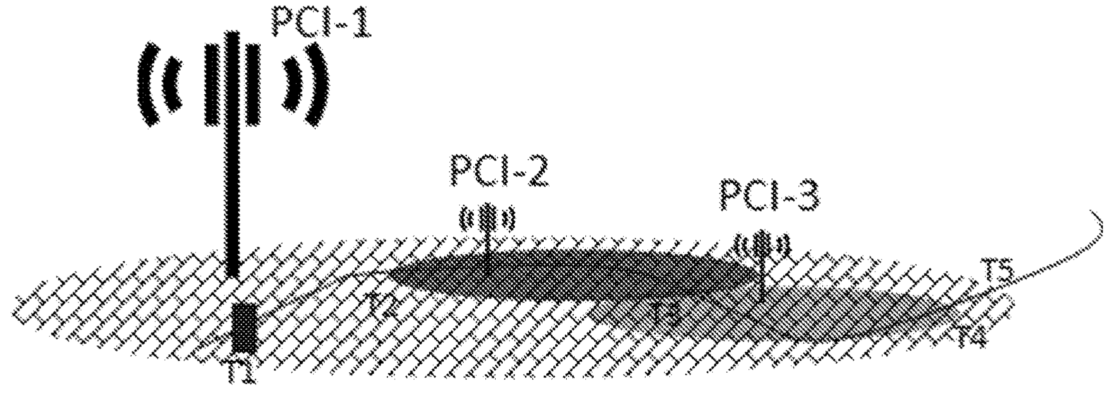
FIG. 5 illustrates a network coverage with overlapping coverage for a first PCI.

Hence, in this option, there is no update of PCI for the serving cell to use for serving cell measurements upon receipt of MAC CEs or any other L1/L2 signalling. That option may be configured in case the network is aware that there is always overlapping coverage for the main/first PCI (in ServingCellConfigCommon) and the additional PCIs the UE can be configured with and can move using L1/L2-centric mobility. An example is shown in FIG. 5, where this option can be applied. The coverage of PCI-1 overlaps with the coverage of PCI-2 and PCI-3. Hence, even if the UE moves with L1/L2 signalling between PCI-1, PCI-2, PCI-3, the UE always considers the initial PCI (e.g. PCI-1) for CQD of the serving cell, except if the network changes that with an explicit dedicated signalling (e.g. RRC Reconfiguration message, or by including some indication in the MAC CE that the PCI for serving cell measurement is to be changed with the TCI change indication).

In the above case ("Case 1: Use initial PCI"), both approaches (Approach 1 and Approach 2) for L1/L2-centric inter-cell mobility can be considered, regarding a "serving cell associated with multiple PCI(s)".

When case 1 is applied to approach 1), each PCI update within the same serving cell does not lead to an update of the way the UE performs its serving cell measurements. The UE uses what is called the initial PCI. The notion of serving cell remains unchanged.

When case 1 is applied to approach 2), each PCI update with L1/L2 signalling represents a change in the serving cell. That is, the UE is changing serving cells with the L1/L2 signalling. In that case, the initial PCI may still be used for serving cell measurements (e.g. in a cell hierarchy, the first PCI is associated to the first cell that is the main cell for the purpose of serving cell measurements).

One advantage of this option is that even though the UE is configured with a set of PCIs in RRC_CONNECTED, the initial PCI is always used, so that having multiple PCIs does not create any ambiguity of which PCI is to be used for CQD of a serving cell. Furthermore, the change of PCI with L1/L2 signalling does not trigger a change of the way the UE performs CQD for the serving cell.

Case 2: Different PCI(s) Handled Independently

In this case, the different PCI(s) with which the UE is configured are treated (or handled) independently when the UE performs serving cell measurements. For example, SSBs are combined or consolidated to compute serving cell measurements if they are associated to the same PCI.

When the UE considers a cell to be a PCell, e.g., during connection setup or connection resume, the UE performs CQD for the PCell only based on the PCI associated to the PCell the UE was connected to when it performed the random access before the state transition. If for that serving cell, the UE is configured with multiple PCI(s), e.g., a PCI is associated to a configured TCI state of that serving cell, and the UE receives a L1/L2 signaling indicating a TCI state associated to a different PCI (e.g. PCI-2), the UE performs CQD for serving cell measurements for that serving cell using the newly indicated PCI, e.g. PCI-2.

Hence, upon reception of a L1/L2 signaling for L1/L2-centric mobility (e.g. an indication of TCI state for a UE-specific PDCCH), the UE determines if the TCI state indicated is associated to a PCI that is different than the one of the current serving cell (e.g. the previous PCI associated to the latest indication TCI state for PDCCH and/or the PCI within Serving Cell Config Common). If the PCI is different, the UE assumes, for CQD, that the PCI of the serving cell for performing CQD is the new PCI associated to the TCI state indicated in the L1/L2 signaling. Here, it is introduced the notion of the "current serving cell PCI". It can correspond to the PCI of the serving cell associated to a TCI state for a PDCCH the UE is monitoring. Or in other words, it may be the PCI associated with the SSB that is QCL source for the latest indicated TCI state, i.e. the TCI state (or beam) the UE is currently monitoring.

In one example, the current serving cell PCI may be updated/changed/modified based on the reception of an indication of TCI state for UE-specific PDCCH, e.g. in case the associated PCI is different than the previous one. Upon this update (change or modification, or whatever term indicating that another PCI is to be considered), the UE performs at least the following actions:

- Stop performing serving cell measurements (e.g. RSRP and/or RSRQ and/or SINR measurements based on SSBs) based on the previous PCI;
- Perform at least one of the following actions for the serving cell measurements performed based on the previous PCI:
  - i. Stop the periodical reporting timer or timer T321 or timer T322, whichever one is running, and reset the associated information (e.g. timeToTrigger) for a measId associated to an event (i.e. reportConfig) that has serving cell measurements as input, e.g. A3, A5. That is important to avoid the UE to mix serving cell measurements performed based on different PCIs, and/or to avoid the triggering of a measurement report based on serving cell measurements that are no longer relevant (since the UE has changed its current serving cell PCI);
    - a. Discard or keep available serving cell measurements (i.e. measurements performed based on the previous serving cell PCI);
      - i. In one option, discard available serving cell measurements (i.e. measurements performed based on the previous serving cell PCI);
      - ii. Alternatively, keep the available serving cell measurements (i.e. measurements performed based on the previous serving cell PCI) and filter them together with new samples based on the new PCI; with that alternative, we avoid the situation of various L1/L2 based PCI changes leading to the lack of L3 measurements to possibly trigger the events.
      - iii. Yet another alternative is to make that discarding configurable, like a PCI based filter configured at the UE determining how previous samples based on previous PCI shall be considered in the overall filtered cell quality derivation. For example, the existing L3 filter consider previous samples in a moving window with a parameter a*previous sample and (1−a) *current sample. However, if there is a PCI change, that parameter "a" may either be changed to another parameter or there could be an adjustment factor.
      - iv. In a yet another alternative, the UE keeps filtering each PCI separately as "potential serving cell". When serving cell quality is needed, whether for reporting or for event evaluation, the serving cell quality corresponding to currently L1/L2 selected PCI is applied.
  - ii. Remove a measurement reporting entry for a measId from the VarMeasReportList, if serving cell measurements were included for that measId;
  - iii. If a measurement reporting is ongoing (e.g. periodical reporting timer is running) when the current serving cell PCI changes, the UE could continue to transmit measurement reports, but includes in the measurement report an indication that the current serving cell PCI has changed.
- Start performing serving cell measurements based on the new PCI associated to the indicated TCI state, if not being performed already;
  - i. In one option, that new PCI is known thanks to the RRC-configured association between a TCI state (and the TCI state Id indication in the L1/L2 signaling) and a PCI (e.g. in the TCI state configuration there may be a PCI);
  - ii. In another option, that new PCI is explicitly indicated in the MAC CE, an SSB set ID 0 or 1, or a CORESETPoolID 0,1;

iii. In one embodiment, upon reception of the TCI state indication (e.g. MAC CE) associated to a new PCI, the MAC layer indicates to higher layer (e.g. RRC) a change in the current serving cell PCI; RRC can take that into account when performing serving cell measurements and/or to perform further actions, e.g. some of the actions described above like removal of measurements, keeping the measurements and application of a filter configuration, etc.;

iv. In one embodiment, upon reception of the TCI state indication the MAC entity at the UE indicates to higher layers the information regarding the TCI State Indication for UE-specific PDCCH MAC CE (then it is the upper layers, e.g. RRC, that determines the PCI thanks to the mapping between TCI state and PCI);

v. In another embodiment, upon reception of the TCI state indication (e.g. MAC CE) associated to a new PCI, the MAC layer indicates to higher layer (e.g. RRC) a change in the current serving cell PCI to the physical layer so that the physical layer performs L1 measurements that are input to L3 filtered RRM measurements relying on the current PCI for the serving cell;

vi. As stated before, another way to configure the UE is to configure the UE with SSB sets that have other PCI associated to them, in the serving cell configuration. These SSB sets would have an index. In the TCI state configuration, an index of the SSB set is referred to, in combination with an exact SSB beam index from that SSB set. It is possible these sets will be named differently to reflect "inter PCI candidates", thus the SSB set index is an example of an RRC configuration specific ID given to the PCI (SSB set) to be used in the L1/L2 mobility in UE's current RRC configuration. Thus, an alternative embodiment uses this ID which we can call here SSB set ID instead of PCI in any of the above embodiments. This is true also for the below MAC specification for example;

vii. Both indications can be exemplified in the following example (changes to the MAC procedure for reception of an indication of TCI state for UE-specific PDCCH):

(TS 38.321)

5.18.5 Indication of TCI State for UE-Specific PDCCH

The network may indicate a TCI state for PDCCH reception for a CORESET of a Serving Cell or a set of Serving Cells configured in simultaneousTCI-UpdateList1-*r*16 or simultaneousTCI-UpdateList2-*r*16 by sending the TCI State Indication for UE-specific PDCCH MAC CE described in clause 6.1.3.15. The indicated TCI state may be associated to a PCI that differs from the PCI of the previously indicated TCI state; in that case the current serving cell PCI is updated.

The MAC entity shall:

1> if the MAC entity receives a TCI State Indication for UE-specific PDCCH MAC CE on a Serving Cell:
  2> indicate to lower layers the information regarding the TCI State Indication for UE-specific PDCCH MAC CE.
  2> if the indicated TCI State Indication for UE-specific PDCCH MAC CE is associated to a different PCI compared to the current's serving cell PCI:
    3> consider the new current's serving cell PCI to be the one associated to the indicated TCI state;
    3> indicate to lower layers the new current's serving cell PCI (e.g. so lower layers compute SS-RSRP based on new current's serving cell PCI);
    3> indicate to higher layers the new current's serving cell PCI;

(TS 38.331)

5.5.3 Performing Measurements 5.5.3.1 General

An RRC_CONNECTED UE shall derive cell measurement results by measuring one or multiple beams associated per cell as configured by the network, as described in 5.5.3.3. ( . . . )

( . . . )

The UE shall:

1> whenever the UE has a measConfig, perform RSRP and RSRQ measurements for each serving cell for which servingCellMO is configured as follows:
  2> if the reportConfig associated with at least one measId included in the measIdList within VarMeasConfig contains an rsType set to ssb and ssb-ConfigMobility is configured in the measObject indicated by the servingCellMO:
    ( . . . )
    3> derive serving cell measurement results based on SS/PBCH block, as described in 5.5.3.3;
  2> if the reportConfig associated with at least one measId included in the measIdList within VarMeasConfig contains an rsType set to csi-rs and CSI-RS-ResourceConfigMobility is configured in the measObject indicated by the servingCellMO:
    ( . . . )
    3> derive serving cell measurement results based on CSI-RS, as described in 5.5.3.3;
1> for each serving cell for which servingCellMO is configured, if the reportConfig associated with at least one measId included in the measIdList within VarMeasConfig contains SINR as trigger quantity and/or reporting quantity:
  2> if the reportConfig contains rsType set to ssb and ssb-ConfigMobility is configured in the servingCellMO:
    ( . . . )
    3> derive serving cell SINR based on SS/PBCH block, as described in 5.5.3.3;
  2> if the reportConfig contains rsType set to csi-rs and CSI-RS-ResourceConfigMobility is configured in the servingCellMO:
    ( . . . )
    3> derive serving cell SINR based on CSI-RS, as described in 5.5.3.3;
    ( . . . )

5.5.3.3 Derivation of Cell Measurement Results ( . . . ) The UE shall:

1> for each cell measurement quantity to be derived based on SS/PBCH block:
  2> if nrofSS-BlocksToAverage is not configured in the associated measObject in RRC_CONNECTED or in the associated entry in measIdleCarrierListNR within varMeasIdleConfig in RRC_IDLE/RRC_INACTIVE; or
  2> if absThreshSS-BlocksConsolidation is not configured in the associated measObject in RRC_CONNECTED or in the associated entry in measIdleCarrierListNR within VarMeasIdleConfig in RRC_IDLE/RRC_INACTIVE; or
  2> if the highest beam measurement quantity value is below or equal to absThreshSS-BlocksConsolidation:

3> if the UE is configured with multiple PCIs (for L1/L2-centric mobility) and this is a serving cell measurement:

4> derive each cell measurement quantity using the current serving cell PCI based on SS/PBCH block as the highest beam measurement quantity value, where each beam measurement quantity is described in TS 38.215 [9];

3> else:

4> derive each cell measurement quantity based on SS/PBCH block as the highest beam measurement quantity value, where each beam measurement quantity is described in TS 38.215 [9];

2> else:

3> if the UE is configured with multiple PCIs (for L1/L2-centric mobility) and this is a serving cell measurement:

4> derive each cell measurement quantity using the current serving cell PCI based on SS/PBCH block as the linear power scale average of the highest beam measurement quantity values above absThreshSS-BlocksConsolidation where the total number of averaged beams shall not exceed nrofSS-BlocksToAverage;

3> else:

4> derive each cell measurement quantity based on SS/PBCH block as the linear power scale average of the highest beam measurement quantity values above absThreshSS-BlocksConsolidation where the total number of averaged beams shall not exceed nrofSS-BlocksToAverage;

2> if in RRC_CONNECTED, apply layer 3 cell filtering as described in 5.5.3.2;

[ . . . ]

In some examples, upon the update of the UE's current serving cell PCI (e.g. via a MAC CE for a TCI state indication for a UE-specific PDCCH whose TCI state is associated to a new PCI different from the current one), the UE considers the other configured PCIs for the serving cell as blacklisted PCIs. In other words, except for the current serving cell PCI, for RRM measurements performed according to an RRC Measurement Configuration (IE MeasConfig), all other additional PCIs are considered as blacklisted and the UE does not consider them as neighbour cell PCIs(s). Being considered as blacklisted means that these are not considered as applicable PCIs and are not valid neighbour cells.

When the UE is configured with multiple PCI(s) for L1/L2 centric mobility, the UE has a PCI associated with the cell it has just connected (e.g. the PCI in ServingCellConfigCommon, denoted first PCI) and the additional PCIs. At that moment, the UE monitors PDCCH associated to a TCI state associated to the first PCI. Hence, all other additional PCIs (e.g. PCI-2, PCI-3, PCI-4) are assumed to be blacklisted, i.e. not considered as neighbour cells PCI(s) for RRM measurements according to MeasConfig. In principle, that could be explicitly signalled in MeasConfig, using a blacklist within the measurement object associated to the serving cell.

However, that is not sufficient in case of an update of UE's current serving cell PCI and a UE autonomous action is required to avoid a heavy RRC signalling upon each TCI state update with PCI change. Hence, according to this example, upon reception of an indication of a TCI state update associated to one of the additional PCI(s), the current PCI and all other configured PCIs become blacklisted autonomously.

A possible impact in the specifications is shown below: (TS 38.331)

5.5.4 Measurement Report Triggering 5.5.4.1 General

If AS security has been activated successfully, the UE shall:

1> for each measId included in the measIdList within VarMeasConfig:

2> if the corresponding reportConfig includes a reportType set to eventTriggered or periodical:

3> if the corresponding measObject concerns NR:

4> if the eventA1 or eventA2 is configured in the corresponding reportConfig:

5> if the UE is configured with multiple PCIs (for L1/L2-centric mobility) and this is a serving cell measurement:

6> consider only the current serving cell PCI to be applicable;

NOTE: When only the current serving cell PCI is applicable the UE considers the other configured PCIs as blacklisted neighbour cells;

5> else:

6> consider only the serving cell to be applicable;

( . . . )

4> if corresponding reportConfig includes reportType set to periodical; or

4> for measurement events other than eventA1 or eventA2:

5> if use WhiteCellList is set to true:

6> consider any neighbouring cell detected based on parameters in the associated measObjectNR to be applicable when the concerned cell is included in the whiteCellsToAddModList defined within the VarMeasConfig for this measId;

5> else:

6> consider any neighbouring cell detected based on parameters in the associated measObjectNR to be applicable when the concerned cell is not included in the blackCellsToAddModList defined within the VarMeasConfig for this measId;

6> consider any neighbouring cell detected based on parameters in the associated measObjectNR to be applicable when the PCI associated to the concerned cell is not one of the multiple PCI(s) configured for L1/L2-centric mobility, except if that is the current serving cell PCI;

( . . . )

When it is stated that "the UE is configured with different PCI(s)", both solutions/approaches for L1/L2-centric inter-cell mobility can be considered for the examples in case 2, with:

approach 1) Intra-cell multi-PCI L1/L2 centric mobility: in this case, the different PCIs are associated to one cell; that one cell has a first PCI and a set of additional PCIs; update of PCI does not mean a change of cell;

approach 2) Inter-cell multi-PCI L1/L2 centric mobility: in this case, the different PCIs are associated to different cells; the UE still connects to one cell, and that one cell has a first PCI. In that one cell, the UE is configured with a set of additional PCIs (each associated to another cell); an update of PCI means a change of serving cell.

When case 2 is applied to approach 1), each PCI update (with L1/L2 signalling) within the same serving cell triggers the UE to update the way the UE performs serving cell measurements, i.e., the UE stops performing serving cell measurements based on the previous PCI and starts to perform serving cell measurements based on the latest updated PCI. That can be done, as explained above, according to the indication in L1/L2 signalling (implicit, based on the TCI state indication and its known relation to a PCI in the RRC configuration, or explicit, if the PCI or a mapped identifier is signalled in the L1/L2 signalling).

When case 2 is applied to approach 2), each PCI update, with L1/L2 signalling, represents a change in the serving cell. In other words, the UE is changing cell with the L1/L2 signalling. In that case, a change of PCI represents a change of serving cell, which leads the UE to change the way of performing serving cell measurements, as the serving cell and its PCI have changed. As the procedure of changing PCI and serving cell may be triggered at the MAC layer, for example, upon reception of a MAC CE with a TCI state indication implicitly or explicitly indicating a new PCI, the MAC layer may inform the higher layers (e.g. RRC layers) responsible for RRM measurements so that the serving cell measurements are then based on the new PCI. One example of how this could be done is shown below:

(TS 38.321)

5.18.5 Indication of TCI State for UE-Specific PDCCH

The network may indicate a TCI state for PDCCH reception for a CORESET of a Serving Cell or a set of Serving Cells configured in simultaneousTCI-UpdateList1-*r*16 or simultaneousTCI-UpdateList2-*r*16 by sending the TCI State Indication for UE-specific PDCCH MAC CE described in clause 6.1.3.15. The indicated TCI state may be associated to a PCI that differs from the PCI of the previously indicated TCI state and that is associated to a non-serving cell; in that case the current serving cell is updated.

The MAC entity shall:

- 1> if the MAC entity receives a TCI State Indication for UE-specific PDCCH MAC CE on a Serving Cell:
  - 2> indicate to lower layers the information regarding the TCI State Indication for UE-specific PDCCH MAC CE.
  - 2> if the indicated TCI State Indication for UE-specific PDCCH MAC CE is associated to a different PCI compared to the serving cell PCI:
    - 3> consider the serving cell (e.g. PCell) to be the cell with PCI associated to the indicated TCI state;
    - 3> indicate to higher layers the new current's serving cell;

One advantage of this option is that even though the UE is configured with a set of PCIs in RRC_CONNECTED and is considered to be connected to a serving cell, it may be said that the UE always has one of the PCIs as the PCI of the serving cell, which facilitates some of the higher layer procedures so that measurements are always based on a single PCI, similar to legacy, but at the same time the method handles how a switch of PCI reflects on cell quality derivation for serving cell measurements.

Case 3: Combine Different PCI(s)

In this case, the different PCI(s) with which the UE is configured for L1/L2-centric mobility are combined (or jointly consolidated) when the UE performs serving cell measurements. In other words, SSBs associated to the different PCIs can be combined or consolidated to compute serving cell measurements. For example, serving cell quality of a cell associated to PCI-1 and PCI-2 can be the highest beam quality (e.g. highest SS-RSRP) among the set of beams (e.g. SSBs) associated to both PCI-1 and PCI-2 (or, the UE can average beam qualities, like SS-RSRPs, associated to SSBs from multiple PCIs).

These examples are equally applicable for inter-PO/inter-cell multi-TRP, in addition to the case of L1/L2-centric inter-cell mobility; the difference would be that the UE is connected to multiple TRPs simultaneously.

Figure 6:
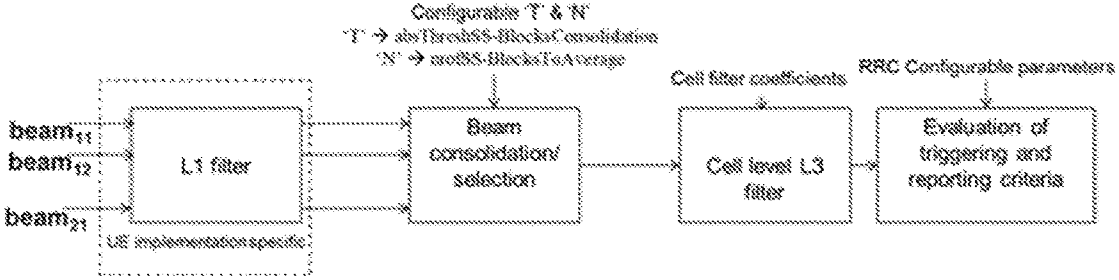
FIG. 6 is an example of a measurement model where the L1 level beam is consolidated for multiple PCIs.

The UE performs the CQD of the serving cell based on at least one of the following:

- L1 level beam (e.g. SSB) consolidation belonging to multiple PCIs—In this method, the beams (e.g. SSBs) associated to all configured PCIs (e.g. included in different TCI states) are combined into a serving cell measurement (serving cell RSRP, RSRQ or SINR), as illustrated in FIG. 6.

After the UE obtains L1 beam measurements (e.g. SSB measurements for the one or multiple PCIs associated with a serving cell), the UE applies a beam consolidation/selection function.

In one example, for the serving cell, the UE shall derive the serving cell measurement quantity (e.g. RSRP, RSRQ, SINR) based on SS/PBCH block (SSB) as the highest beam measurement quantity value (out of the beam measurement quantity values from all multiple configured PCIs), where each beam measurement quantity is described in TS 38.215.

In some other examples, for the serving cell, the UE is configured with parameters for the beam consolidation/selection function. The parameters for that function are configuration by the network, e.g. in measConfig, as part of the measurement object configuration associated to the serving cell the UE is performing measurements for.

In another example, for the serving cell, the UE shall derive the serving cell measurement quantity based on SS/PBCH blocks of the multiple PCIs associated to L1 mobility as the linear power scale average of the highest beam measurement quantity values, where the total number of averaged beams shall not exceed N. Further conditions may be applicable for this example. In another variant, instead of a linear power scale average, a weighted average is used, with measurements associated to different PCIs having different weights.

One advantage of this example is that the UE derives serving cell quality using beams from multiple PCIs where it can move with beam management procedures, producing a fair measurement to be compared with a neighbour cell measurement. Another advantage of this alternative is the lower complexity at the UE implementation, where some of the processes defined after the L1 filter may remain similar to what is done in legacy. For example, beam consolidation receives a set of beam measurements from the L1 filter as input, but according to the method these are associated to different PCIs.

Figure 7:
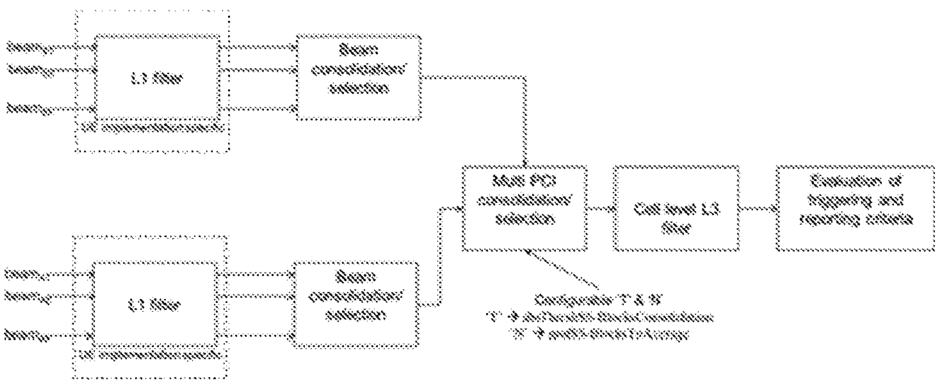
FIG. 7 is an example of a measurement model where the L1 level beam is consolidated per PCI and there is further consolidation of cell quantities belonging to different PCIs.
Figure 8:
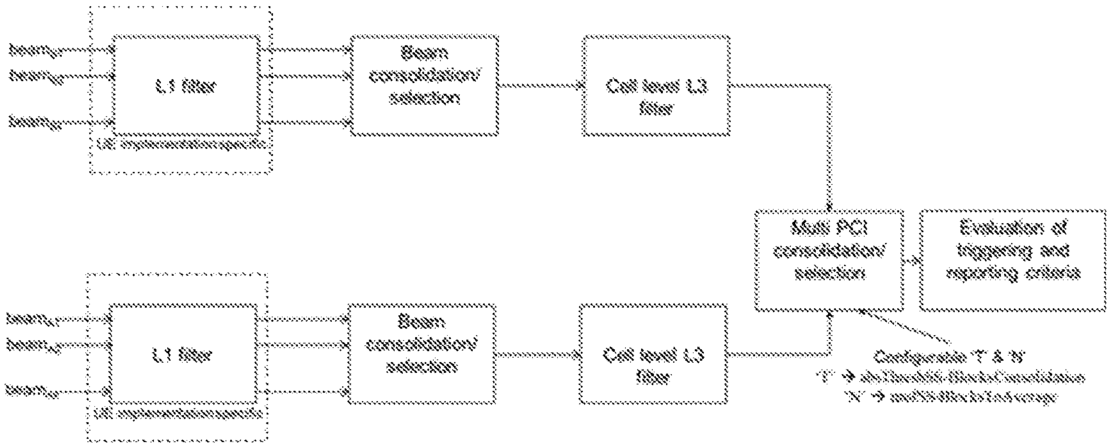
FIG. 8 is an example of a measurement model where L1 level beam (e.g. SSB) is consolidated per PCI to produce a PCI level measurement quantity which is further filtered to produce L1 measurement results.

- L1 level beam (e.g. SSB) consolidation per PCI and further consolidation of cell quantities belonging to different PCIs—In this method, the beam level consolidation is performed for each of the configured PCIs for L1/L2 centric-mobility (e.g. each PCI included in the TCI state configurations) and then these PCI level measurements are further consolidated to produce a single measurement quantity and this measurement quantity is filtered to produce the L3 measurements, as illustrated in FIG. 7. The advantage of this solution is that there is no need to perform per PCI level L3 filtering, thus reducing the processing overhead at the UE side.
- L1 level beam (e.g.SSB) consolidation per PCI to produce a PCI level measurement quantity which is further filtered to produce L1 measurement results and then these measurements are consolidated to produce a single measurement quantity—In this method, the beam level consolidation is performed for each of the PCI included in the TCI states of the servignCellConfigCommon and then these PCI level measurements are further consolidated to produce a single measurement quantity and this measurement quantity is filtered to produce the L3 measurements, as illustrated in FIG. 8. The advantage of this solution is that there is no consolidation required to be performed at the SSB level and the currently existing PCI level L3 measurements are combined to produce a single measurement quantity.

In one example, a single pair of parameters are used: N (e.g. nrofSS-BlocksToAverage) and T (absThreshSS-BlocksConsolidation), the same pair can be used for all beam measurements for the different PCIs. In that case, the UE shall derive the serving cell measurement quantity based on SS/PBCH blocks of the multiple PCIs associated to L1 mobility as the linear power scale average of the highest beam measurement quantity values above 'T', where the total number of averaged beams shall not exceed N. Further conditions may be applicable for the method to be applied.

In one example, the L3 filtering coefficients to be used to perform the L1 mobility related serving cell measurements' filtering can be differently configured compared to the other cell related measurements.

An example below shows how some of the examples can be implemented in the RRC specifications (including further conditions for selecting one embodiment/example or another for CQD of serving cell measurements for a UE configured with L1/L2-centric mobility):

[38.331]

The UE shall:

1> for each serving cell measurement quantity associated to the set of PCIs configured for L1/L2-centric mobility to be derived based on SS/PBCH block:

2> if nrofSS-BlocksToAverage is not configured in the associated measObject in RRC_CONNECIED or in the associated entry in measIdleCarrierListNR within varMeasIdleConfig in RRC_IDLE/RRC_INACTIVE; or 2> if absThreshSS-BlocksConsolidation is not configured in the associated measObject in RRC_CONNECIED or in the associated entry in measIdleCarrierListNR within VarMeasIdleConfig in RRC_IDLE/RRC_INACTIVE; or 2> if the highest beam measurement quantity value of each of the PCIs associated to L1/L2-centric mobility is below or equal to absThreshSS-BlocksConsolidation:

3> derive the serving cell measurement quantity based on SS/PBCH block as the highest beam measurement quantity value out of the highest beam measurement quantity values associated with the multiple PCIs, where each beam measurement quantity is described in TS 38.215 [9];

2> else:

3> derive the serving cell measurement quantity based on SS/PBCH blocks of the PCIs associated to L1 mobility as the linear power scale average of the highest beam measurement quantity values above absThreshSS-BlocksConsolidation where the total number of averaged beams shall not exceed nrofSS-BlocksToAverage;

2> if in RRC_CONNECTED, apply layer 3 cell filtering as described in 5.5.3.2;

If case 3 is implemented to Approach 1), the examples in case 3 describe multiple PCIs of the same serving cell. One example of how the measurement model description in TS 38.300 could be modified is shown as follows:

[38.300]

In RRC_CONNECTED, the UE measures multiple beams (at least one) of a cell and the measurements results (power values) are averaged to derive the cell quality. In the case of L1/L2-centric mobility, with the serving cell associated with multiple physical cell identities (PCIs), the UE measures multiple beams (at least one) of a cell but associated to these multiple PCIs and the measurements results (power values) are averaged to derive the cell quality of a serving cell. ( . . . ) Cell quality from beam measurements is derived in the same way for the serving cell(s) and for the non-serving cell(s), except in the case the serving cell is configured with L1/L2-centric mobility, wherein beams associated to multiple PCIs of the serving cell are averaged. Measurement reports may contain the measurement results of the Xbest beams if the UE is configured to do so by the gNB.

If case 3 is implemented to approach 2), when multiple PCIs are mentioned, it is meant multiple cells. And combining beams (e.g. SSBs) from multiple PCIs for CQD of the serving cell means combining multiple beams (e.g. SSBs) of multiple cells. The final result is a single cell quality, which may be called a representation of a serving cell quality, e.g. equivalent serving cell quality, even if it is computed considering beams from multiple cells (cells in the serving cell set, wherein the UE can perform L1/L2 centric mobility). One example of how the measurement model description in TS 38.300 could be modified is shown as follows:

[38.300]

In RRC_CONNECTED, the UE measures multiple beams (at least one) of a cell and the measurements results (power values) are averaged to derive the cell quality. In the case of L1/L2-centric mobility, for serving cell measurements, the UE measures multiple beams (at least one) of one or multiple cells the UE is configured for L1/L2-centric mobility and the measurements results (power values) are averaged to derive the equivalent cell quality to be considered a serving cell quality for the purpose of event triggering and measurement reporting. ( . . . ) Cell quality from beam measurements is derived in the same way for the serving cell(s) and for the non-serving cell(s), except in the case the serving cell is configured with L1/L2-centric mobility, wherein beams associated to multiple cells are averaged. Measurement reports may contain the measurement results of the Xbest beams if the UE is configured to do so by the gNB.

In one example, at least one parameter for the beam selection/consolidation is defined per PCI and/or per group of PCIs. For example, if a UE is configured in the serving cell with PCI-1 and PCI-2, the UE could be configured with T1 for PCI-1, and T2 for PCI-2. That means that the UE only performs CQD on beams of PCI-1 whose measurements are above T1, beams of PCI-2 whose measurements are above T2. In that case, the UE shall derive the serving cell measurement quantity based on SS/PBCH blocks of the multiple PCIs associated to L1 mobility as the linear power scale average of the highest beam measurement quantity values above 'T1' for beams associated to PCI-1, and the highest beam measurement quantity values above 'T2' for beams associated to PCI-2, where the total number of averaged beams shall not exceed N. Further conditions may be applicable for the example.

An example below shows how some of the embodiments can be implemented:

The UE shall:

1> for each serving cell measurement quantity associated to the set of PCIs associated to L1 mobility to be derived based on SS/PBCH block:

2> for each cell measurement quantity to be derived based on SS/PBCH block:

3> if nrofSS-BlocksToAverage is not configured in the associated measObject in RRC_CONNECTED or in the associated entry in measIdleCarrierListNR within varMeasIdleConfig in RRC_IDLE/RRC_INACTIVE; or 3> if absThreshSS-BlocksConsolidation is not configured in the associated measObject in RRC_CONNECTED or in the associated entry in measIdleCarrierListNR within varMeasIdleConfig in RRC_IDLE/RRC_INACTIVE; or 3> if the highest beam measurement quantity value is below or equal to absThreshSS-BlocksConsolidation:

4> derive each cell measurement quantity based on SS/PBCH block as the highest beam measurement quantity value, where each beam measurement quantity is described in TS 38.215 [9];

3> else:

4> derive each cell measurement quantity based on SS/PBCH block as the linear power scale average of the highest beam measurement quantity values above absThreshSS-BlocksConsolidation where the total number of averaged beams shall not exceed nrofSS-BlocksToAverage;

2> if nrofPCIsToAverage is not configured in the associated measObject in RRC_CONNECTED or in the associated entry in measIdleCarrierListNR within varMeasIdleConfig in RRC_IDLE/RRC_INACTIVE; or 2> if absThreshPCIConsolidation is not configured in the associated measObject in RRC_CONNECTED or in the associated entry in measIdleCarrierListNR within varMeasIdleConfig in RRC_IDLE/RRC_INACTIVE; or 2> if the highest cell measurement quantity value associated to each of the PCIs configured for L1 mobility is below or equal to absThreshSS-BlocksConsolidation:

3> derive the serving cell measurement quantity based on highest cell measurement quantity value;

2> else:

3> derive the serving cell measurement quantity based on the respective SS/PBCH block based measurement quantities of the PCIs associated to L1 mobility as the linear power scale average of the highest cell measurement quantity values above absThreshPCIConsolidation where the total number of averaged cells shall not exceed nrofPCIsToAverage;

2> if in RRC_CONNECTED, apply layer 3 cell filtering as described in 5.5.3.2;

[ . . . ]

Below is another example of how some of the embodiments can be implemented:

The UE shall:

1> for each serving cell measurement quantity associated to the set of PCIs associated to L1 mobility to be derived based on SS/PBCH block:

2> for each cell measurement quantity to be derived based on SS/PBCH block:

3> if nrofSS-BlocksToAverage is not configured in the associated measObject in RRC_CONNECTED or in the associated entry in measIdleCarrierListNR within varMeasIdleConfig in RRC_IDLE/RRC_INACTIVE; or 3> if absThreshSS-BlocksConsolidation is not configured in the associated measObject in RRC_CONNECTED or in the associated entry in measIdleCarrierListNR within varMeasIdleConfig in RRC_IDLE/RRC_INACTIVE; or 3> if the highest beam measurement quantity value is below or equal to absThreshSS-BlocksConsolidation:

4> derive each cell measurement quantity based on SS/PBCH block as the highest beam measurement quantity value, where each beam measurement quantity is described in TS 38.215 [9];

3> else:

4> derive each cell measurement quantity based on SS/PBCH block as the linear power scale average of the highest beam measurement quantity values above absThreshSS-BlocksConsolidation where the total number of averaged beams shall not exceed nrofSS-BlocksToAverage;

2> if in RRC_CONNECTED, apply layer 3 cell filtering as described in 5.5.3.2;

2> if nrofPCIsToAverage is not configured in the associated measObject in RRC_CONNECTED or in the associated entry in measIdleCarrierListNR within varMeasIdleConfig in RRC_IDLE/RRC_INACTIVE; or 2> if absThreshPCIConsolidation is not configured in the associated measObject in RRC_CONNECTED or in the associated entry in measIdleCarrierListNR within varMeasIdleConfig in RRC_IDLE/RRC_INACTIVE; or 2> if the highest cell measurement quantity value associated to each of the PCIs configured for L1 mobility is below or equal to absThreshSS-BlocksConsolidation:

3> derive the serving cell measurement quantity based on highest cell measurement quantity value;

2> else:

3> derive the serving cell measurement quantity based on the respective SS/PBCH block based measurement quantities of the PCIs associated to L1 mobility as the linear power scale average of the highest cell measurement quantity values above absThreshPCIConsolidation where the total number of averaged cells shall not exceed nrofPCIsToAverage;

( . . . )

Measurement Events and Measurement Reporting for Case 1, Case 2 and Case 3:

In the following example, it is described how case 1 and case 2 are applicable to measurements events A1 to A6, B1 and B2, and how they are applicable to the measurement reporting.

Event A1: Serving Cell Becomes Better than Absolute Threshold

In one example, the UE is configured with an event A1 (in reportConfig), associated to a measurement object. A measurement report can be triggered if the entry condition is fulfilled, with the entry condition being that the serving cell measurements performed according to any of the examples of case 1, case 2 or case 3 become better than an absolute threshold. Upon fulfillment of the condition, the UE includes the serving cell measurements performed according to any of the examples of case 1 and case 2 in a measurement report.

Upon reception of the measurement report, the network can determine to take further decisions, such as de-configuring measurement gaps, removing the configuration of inter-frequency measurements (since the serving frequency is better than an absolute threshold).

Event A2: Serving Cell Becomes Worse than Absolute Threshold

In one example, the UE is configured with an event A2 (in reportConfig), associated to a measurement object. A measurement report can be triggered if the entry condition is fulfilled, with the entry condition being that the serving cell measurements performed according to any of the examples of case 1 and case 2 become worse than an absolute threshold. Upon fulfillment of the condition, the UE includes the serving cell measurements performed according to any of the examples of case 1 and case 2 in a measurement report.

Upon reception of the measurement report, the network can determine to take further actions, such as configuring measurement gaps, adding the configuration of inter-frequency measurements (since the serving frequency is worse than an absolute threshold, and if measurement reports related to A3 events are not being received, that is a sign that the UE should search for cells in other frequencies for a possible inter-frequency reconfiguration with sync/handover).

Event A3: Neighbour Cell Becomes Amount of Offset Better than PCell/PSCell

In one example, the UE is configured with an event A3 (in reportConfig), associated to a measurement object. A measurement report can be triggered if the entry condition is fulfilled, with the entry condition being that a neighbour cell measurements become amount of offset better than PCell/PSCell measurements, with the PCell measurements being performed according to any of the examples of case 1, case 2 or case 3. Upon fulfillment of the condition, the UE includes the serving cell measurements performed according to any of the examples of case 1, case 2 or case 3 in a measurement report.

Upon reception of the measurement report, the network can determine to take further actions, such as triggering a handover.

Event A4: Neighbour Cell Becomes Better than Absolute Threshold

In one example, the UE is configured with an event A4 (in reportConfig), associated to a measurement object. A measurement report can be triggered if the entry condition is fulfilled, with the entry condition being that a neighbor cell measurements become better than an absolute threshold. Upon fulfillment of the condition the UE includes the serving cell measurements performed according to any of the examples of in case 1, case 2 or case 3) in a measurement report.

Upon reception of the measurement report, the network can determine to take further actions, such as triggering an inter-frequency handover, adding and/or removing an SCell, etc.

Event AS: PCell/PSCell Becomes Worse than Absolute Threshold1 AND Neighbour Cell/SCell Becomes Better than Another Absolute Threshold2

In one example, the UE is configured with an event A5 (in reportConfig), associated to a measurement object. A measurement report can be triggered if the entry condition is fulfilled, with the entry condition being that PCell/PSCell measurements become worse than absolute threshold1, with the PCell/PSCell measurements being performed according to any of the examples in case 1, case 2 or case 3, AND, the neighbor cell/SCell measurements become better than another absolute threshold (e.g. as described in case 1, case 2 or case 3), wherein in the case of an SCell, the SCell measurements (e.g. SCell RSRP, SCell RSRQ, SCell SINR) are performed according to any of the examples in case 1, case 2 or case 3.

Upon fulfillment of the condition, the UE includes the serving cell measurements performed according to any of the examples of case 1, case 2 or case 3 in a measurement report.

Upon reception of the measurement report, the network can determine to take further actions, such as triggering an inter-frequency handover, mobility load balancing, etc.

Event A6: Neighbour Cell Becomes Amount of Offset Better than SCell.

In one example, the UE is configured with an event A6 (in reportConfig), associated to a measurement object. A measurement report can be triggered if the entry condition is fulfilled, with the entry condition being that neighbour cell measurements become amount of offset better than SCell measurements, with the SCell measurements being performed according to any of the previous examples described in case 1, case 2 or case 3.

Upon fulfillment of the condition, the UE includes the serving cell measurements performed according to any of the examples in case 1, case or case 3 in a measurement report.

Upon receipt of the measurement report, the network can determine to take further actions, such as triggering an SCell removal, adding, changing, activation and deactivation of cells, etc.

In some examples, the UE has a single hysteresis (hysteresis as defined within reportConfigNR) value independent of the serving cell PCI. In this example, as the UE continues to use the same hysteresis pre and post serving cell PCI change, via TCI state change, any existing event evaluation continues without any impact.

In some other examples, the UE could be configured with a list of hysteresis values and a relation between the hysteresis and the corresponding serving cell PCI. When the TCI state is changed to a PCI which is different from the previously used PCI, the UE uses the hysteresis corresponding to the new PCI for the event evaluations.

```
ReportConfigNR ::=          SEQUENCE {
  reportType                  CHOICE {
    periodical                  PeriodicalReportConfig,
    eventTriggered              EventTriggerConfig,
    ...,
(...)
    [[
      hysteresis                  HysteresisList,
    ]]
  }
}
HysteresisList ::=         SEQUENCE (SIZE (1..maxNrofL1ControlledServingCells)) OF
PciSpecifiCHysteresis
PciSpecifiCHysteresis ::=     SEQUENCE {
  physCellId               PhysCellId,
  hysteresis               Hysteresis,
}
```

In this case, as the UE changes the hysteresis pre and post serving cell PCI change, via the TCI state change, any existing serving cell related event evaluation will be subjected to at least one of the following procedures:

1) if a measurement report has not been sent for the associated measID:
   i. if the new hysteresis is larger than the previous hysteresis and if the UE does not meet the event entering condition anymore, stop the associated time to trigger (TTT) related evaluation.
   ii. if the new hysteresis is larger than the previous hysteresis and if the UE still meets the event entering condition, re-start the associated time to trigger (TTT) related evaluation. The re-starting is to ensure that the event entering condition stays the same/valid during the entire span of TTT, while using the new value of hysteresis.
   iii. if the new hysteresis is smaller than the previous hysteresis and if the UE still meets the event entering condition, continue the associated time to trigger (TTT) related evaluation.
   iv. if the new hysteresis is smaller than the previous hysteresis and if the UE now meets (previously not) the event entering condition, start the associated time to trigger (TTT) related evaluation.
2) if a measurement report has already been sent for the associated measID:
   i. reset any ongoing event evaluation (i.e., ongoing TTT evaluation).
   ii. reset the number of reports sent for this measID to zero.

The methods described in the disclosure concern how the UE performs serving cell measurements when it is configured with multiple PCIs. In the just above section, the scenarios where these serving cell measurements performed according to the methods are reported to a network node, due to the triggering of a measurement event. In addition, there may be other scenarios where the UE transmits serving cell measurements to the network, performed according to the methods, such as at least one of the following: RLF report; MCG Failure report; SCG failure report; a measurement report transmitted via the MCG while the UE is in MR-DC; etc.

Examples Related to How the UE Gets to Know the List of PCIs Belonging to the L1 Mobility and Treat them Under the CQD Methods Listed in Case 1, Case 2 and Case 3

In some examples, the UE derives the list of PCIs that belongs to the L1/L2-centric mobility implicitly based on the L1 configurations. In such an example, upon decoding the different TCI state configurations, the UE will get to know the cells amongst which the L1 based mobility can be performed by the network. Such PCIs are then used to derive the single SpCell level cell quality based on one of the methods described above.

In some other examples, the UE receives the list of PCIs whose beams should be combined to derive a single measurement quantity via the measurement object, i.e., this list is explicitly configured. See an example of configuration below:

```
MeasObjectNR ::=                         SEQUENCE {
  ssbFrequency                             ARFCN-ValueNR
[...]
  multiPCIListForCombedCQD            MultiPCIListForCombedCQD OPTIONAL,   -- Need R
[...]
}
MultiPCIListForCombedCQD SEQUENCE (SIZE (1..maxNrofPCIsinMultPCI)) OF PCIForCombedCQD
PCIForCombedCQD ::= SEQUENCE {
  physCellId                               PhysCellId,
}
```

Cell Quality Derivation Parameters' Configuration

In some examples, for different methods captured in case 1, case 2 and case 3, the cell quality derivation parameters 'T' (absThreshSS-BlocksConsolidation) and 'N' (nroISS-BlocksToAverage) used to perform the beam consolidation to derive multi PCI based measurement quantity for the serving cell measurements are the same as the ones used for deriving the cell level measurements from beam level measurements for a single PCI.

In some examples, for different methods captured in case 1, case 2 and case 3, to derive the serving cell measurement quantities, the network can configure different 'T' (absThreshSS-BlocksConsolidation) and 'N' (nrofSS-Blocks-ToAverage) parameters compared to the non-serving cells on the same frequency, see below for an example:

```
MeasObjectNR ::=                    SEQUENCE {
  ssbFrequency                        ARFCN-ValueNR
[...]
  multiPCIRelatedCQDList              MultiPCIRelatedCQDList OPTIONAL,
[...]
}
MultiPCIRelatedCQDList SEQUENCE (SIZE (1..maxNrofPCIsinMultPCI)) OF MultiPCIRelatedCQD
MultiPCIRelatedCQD ::= SEQUENCE {
  physCellId                          PhysCellId,
  absThreshSS-BlocksConsolidation     ThresholdNR
OPTIONAL,   -- Need R
  absThreshCSI-RS-Consolidation       ThresholdNR
OPTIONAL,   -- Need R
  nrofSS-BlocksToAverage              INTEGER (2..maxNrofSS-BlocksToAverage)
OPTIONAL,   -- Need R
  nrofCSI-RS-ResourcesToAverage       INTEGER (2..maxNrofCSI-RS-ResourcesToAverage)
OPTIONAL,   -- Need R
}
```

In some examples, for different methods captured in case 1, case 2 and case 3, the parameters 'T' (absThreshSS-BlocksConsolidation) and 'N' (nrofSS-BlocksToAverage) used to perform the beam consolidation to derive multi PCI based serving cell measurement quantity are different compared to the ones used for deriving the cell level measurement from the beam level measurements for a single PCI.

```
MeasObjectNR ::=                                SEQUENCE {
  ssbFrequency                                    ARFCN-ValueNR
[...]
  absThreshSS-BlocksMultiPCIConsolidation           ThresholdNR
OPTIONAL,   -- Need R
  absThreshCSI-RS-MultiPCIConsolidation             ThresholdNR
OPTIONAL,   -- Need R
  nrofSS-BlocksToAverageForMultiPCI                   INTEGER (2..maxNrofSS-BlocksToAverage)
OPTIONAL,   -- Need R
  nrofCSI-RS-ResourcesToAverageForMultiPCI            INTEGER (2..maxNrofCSI-RS-ResourcesToAverage)
OPTIONAL,   -- Need R
[...]
}
```

In some examples, for different methods captured in case 1, case 2 and case 3, to derive the serving cell measurement quantities, the network can configure different 'T' (absThreshSS-BlocksConsolidation) and 'N' (nrofSS-BlocksToAverage) parameters compared to the cells outside.

```
MeasObjectNR ::=                                SEQUENCE {
  ssbFrequency                                    ARFCN-ValueNR
OPTIONAL,   -- Cond SSBorAssociatedSSB
[...]
  absThreshSS-BlocksMultiPCIConsolidation           ThresholdNR
OPTIONAL,   -- Need R
  absThreshCSI-RS-MultiPCIConsolidation             ThresholdNR
OPTIONAL,   -- Need R
  nrofSS-BlocksToAverageForMultiPCI                   INTEGER (2..maxNrofSS-BlocksToAverage)
OPTIONAL,   -- Need R
  nrofCSI-RS-ResourcesToAverageForMultiPCI            INTEGER (2..maxNrofCSI-RS-ResourcesToAverage)
OPTIONAL,   -- Need R
  multiPCIRelatedCQDList                          MultiPCIRelatedCQDList OPTIONAL,
[...]
}
MultiPCIRelatedCQDList SEQUENCE (SIZE (1..maxNrofPCIsinMultPCI)) OF MultiPCIRelatedCQD
MultiPCIRelatedCQD ::= SEQUENCE {
  physCellId                                      PhysCellId,
  absThreshSS-BlocksConsolidation                 ThresholdNR
OPTIONAL,   -- Need R
  absThreshCSI-RS-Consolidation                   ThresholdNR
OPTIONAL,   -- Need R
  nrofSS-BlocksToAverage                          INTEGER (2..maxNrofSS-BlocksToAverage)
OPTIONAL,   -- Need R
```

-continued

```
  nrofCSI-RS-ResourcesToAverage              INTEGER (2..maxNrofCSI-RS-ResourcesToAverage)
OPTIONAL,   -- Need R
}
```

In some examples, for different methods captured in case 1, case 2 and case 3, the layer 3 filtering parameters in quantityConfigNR-List used to perform the serving cell level and beam level L3 filtering, for a serving cell, which includes L1 based mobility related configuration, are different compared to the ones used for the layer 3 filtering for the cell level measurements for a single PCI.

```
QuantityConfig ::=                SEQUENCE {
  quantityConfigNR-List              SEQUENCE (SIZE (1..maxNrofQuantityConfig)) OF
QuantityConfigNR                  OPTIONAL,   -- Need M
  ...,
  [[
  quantityConfigEUTRA                FilterConfig
OPTIONAL   -- Need M
  ]],
  [[
  quantityConfigUTRA-FDD-r16         QuantityConfigUTRA-FDD-r16
OPTIONAL,   -- Need M
  quantityConfigCLI-r16              FilterConfigCLI-r16
OPTIONAL   -- Need M
  ]],
  quantityConfigServingNR-List          SEQUENCE (SIZE (1..maxNrofQuantityConfig)) OF
QuantityConfigNR                  OPTIONAL,   -- Need M
}
```

In some examples, for different methods captured in case 1, case 2 and case 3, the layer 3 filtering parameters in quantityConfigNR-List used to perform the serving cell level and beam level L3 filtering, for a serving cell which includes L1 based mobility related configuration, are the same as the ones used for the layer 3 filtering for the cell level measurements for a single PCI.

Figure 9:
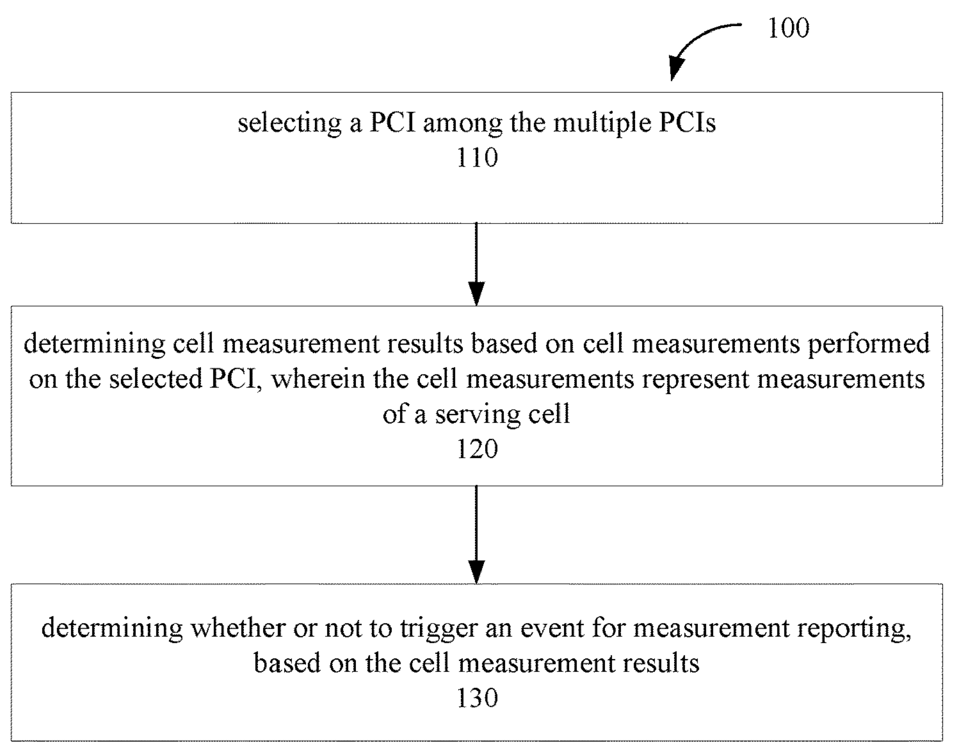
FIGS. 9 and 10 are flow charts of a method in a wireless device, in accordance with an embodiment.

Now turning to FIG. 9, a method 100 in a wireless device for performing cell measurements is described. The wireless device is configured with multiple PCIs for a mobility procedure, wherein the wireless device is configured with one or more cells operating in a same serving frequency, each cell associated with one or more PCIs. The method 100 comprises:

Step 110: selecting a PCI among the multiple PCIs;

Step 120: determining cell measurement results based on cell measurements performed on the selected PCI, wherein the cell measurements represent measurements of a serving cell;

Step 130: determining whether or not to trigger an event for measurement reporting, based on the cell measurement results.

In this disclosure, the mobility procedure is at least a change and/or activation of a cell or a PCI by the wireless device upon receipt of at least one of L1 signaling and L2 signaling.

In some examples, the L1 signaling may comprise DCI and the L2 signaling may comprises a MAC CE.

In some examples, the selected PCI may be a PCI of a cell with which the wireless device transitioned to a connected state and/or a cell to which the wireless device is handed over and/or a cell for which the wireless device receives the configuration for the mobility procedure.

In some examples, the UE may receive a message indicating a change of PCI among the multiple PCIs, wherein the indication of change is from a first PCI to a second PCI. Then, in this case, the second PCI is selected and the cell measurements are performed based on the second PCI. And the UE may stop performing cell measurements based on the first PCI.

In some examples, the second PCI may be associated with a same cell as the first PCI. In some other examples, the second PCI may be associated with a cell that is different from a cell associated with the first PCI.

In some examples, the UE may blacklist the rest of the PCIs in the multiple PCIs, wherein blacklisting the rest of the PCIs may comprise one or more of i) not performing cell measurements on the rest of the PCIs and ii) not triggering event for measurement reporting based on the cell measurements on the rest of the PCIs.

In some examples, determining the cell measurement results may comprise deriving one or more cell measurement quantities based on SS/PBCH block(s) encoding the selected PCI.

In some examples, each cell measurement quantity based on SS/PBCH block(s) encoding the selected PCI may comprise a highest beam measurement quantity value.

In some examples, each cell measurement quantity based on SS/PBCH block(s) encoding the selected PCI may comprise an average of the highest beam measurement quantity values above a threshold, wherein the total number of averaged beams shall not exceed a maximum number.

In some examples, the cell measurement quantity may comprise one or more of a RSRP, a RSRQ and a SINR.

In some examples, the beam measurement quantity value may comprise one or more of SS-RSRP, SS-RSRQ and SS-SINR.

Figure 10:
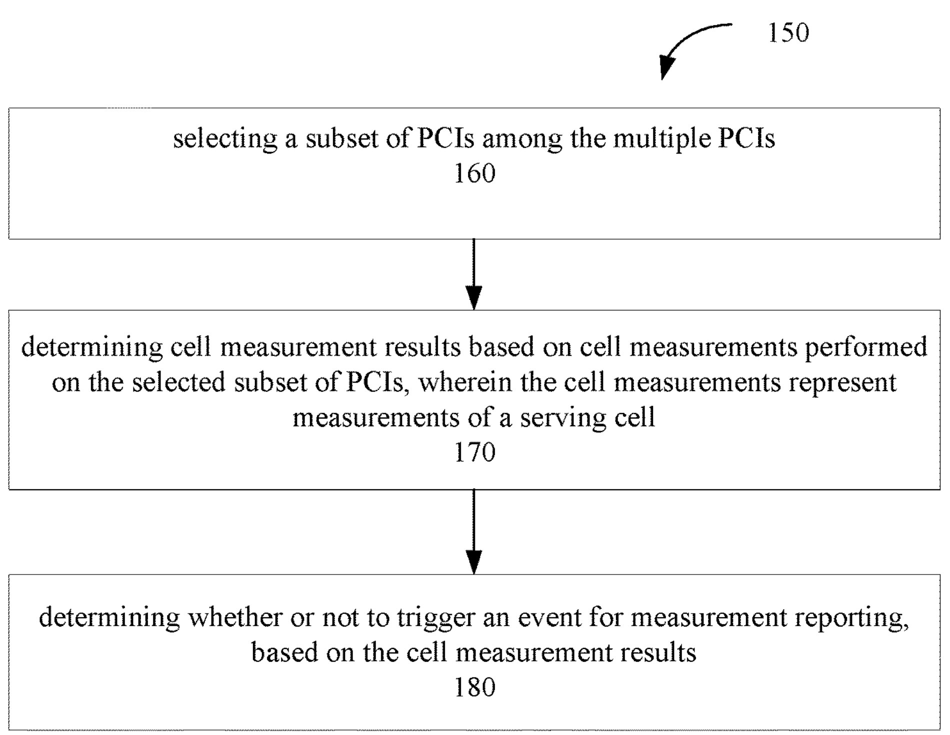

FIG. 10 illustrates a method 150 in a wireless device for performing cell measurements. The wireless device is configured with multiple PCIs for a mobility procedure, wherein the wireless device is configured with one or more cells operating in a same serving frequency, each cell associated with one or more PCIs. The method 150 comprises:

Step 160: selecting a subset of PCIs among the multiple PCIs;

Step 170: determining cell measurement results based on cell measurements performed on the selected subset of PCIs, wherein the cell measurements represent measurements of a serving cell; and Step 180: determining whether or not to trigger an event for measurement reporting, based on the cell measurement results.

It should be noted that a subset of PCIs may comprise one or more PCIs. A subset may also comprise all the PCIs in the multiple PCIs. The case where the subset comprises only one PCI is the same case as in method 100.

In some examples, selecting a subset of PCIs may comprise selecting all the PCIs among the multiple PCIs associated with a same cell.

In some examples, performing the cell measurements based on the subset of PCIs may comprise combining measurements of beams associated with each PCI in the subset of PCIs.

In some examples, the UE may receive parameters for beam consolidation and selection, from a network node.

In some examples, determining the cell measurement results based on the selected subset of PCIs may comprise deriving cell measurement quantities based on the subset of PCIs.

In some examples, the cell measurement quantities may comprise an average of beam measurement quantity values associated with the subset of PCIs.

In some examples, the cell measurement quantity may comprise one or more of a RSRP, a RSRQ and a SINR.

In some examples, the beam measurement quantity value comprises one or more of Synchronization Signal (SS)-RSRP, SS-RSRQ and SS-SINR.

In some examples, determining the trigger for measurement reporting may be in response to determining that the cell measurements are better than a first threshold.

In some examples, determining the trigger for measurement reporting may be in response to determining that the cell measurements are worse than a second threshold.

In some examples, determining the trigger for measurement reporting may be in response to determining that measurements of a neighbour cell become amount of offset better than the cell measurements.

In some examples, determining the trigger for measurement reporting may be in response to determining that measurements of a neighbour cell become better than a third threshold.

In some examples, determining the trigger for measurement reporting may be in response to determining that measurements of a neighbour cell become better than a fourth threshold and the cell measurements become worse than a fifth threshold.

In some examples, determining the trigger for measurement reporting may be in response to determining that measurements of a neighbour cell become amount of offset better than measurements of a secondary cell.

In some examples, the UE receives a L1 signaling or L2 signaling configuration with the multiple PCIs.

FIG. 11 illustrates a method 200 in a network node, for receiving cell measurements from a wireless device. Method 200 comprises:

Step 210: sending a configuration to a wireless device for configuring the wireless device with multiple PCIs for a mobility procedure, wherein the wireless device is configured with one or more cells operating in a same serving frequency, each cell being associated with one or more PCI; and Step 220: receiving a report including cell measurements performed based on a PCI selected among the multiple PCIs, wherein the cell measurements represent measurements of a serving cell.

In some examples, the selected PCI may be associated with a cell with which the wireless device transitioned to a connected state and/or a cell to which the wireless device is handed over and/or a cell for which the wireless device receives the configuration for the mobility procedure.

In some examples, the network node may send a message indicating a change of PCI between the multiple PCIs, wherein the indication of change is from a first PCI to a second PCI.

In some examples, the second PCI may be associated with a same cell as the first PCI or associated with a cell that is different from a cell associated with the first PCI.

FIG. 12 illustrates a method 250 in a network node, for receiving cell measurements from a wireless device. Method 200 comprises:

Step 260: sending a configuration to a wireless device for configuring the wireless device with multiple PCIs for a mobility procedure, wherein the wireless device is configured with one or more cells operating in a same serving frequency, each cell being associated with one or more PCIs; and Step 270: receiving a report including cell measurements performed based on a subset of PCIs selected among the multiple PCIs, wherein the cell measurements represent measurements of a serving cell.

It should be noted that a subset of PCIs may comprise one or more PCIs. A subset may also comprise all of the PCIs in the multiple PCIs. The case where the subset comprises only one PCI is the same case as in method 200.

In some examples, the subset of PCIs may comprise a first PCI and a second PCI among the multiple PCIs.

In some examples, the second PCI may be associated with a same cell as the first PCI or with a cell that is different from a cell associated with the first PCI.

In some examples, the cell measurements performed based on the subset of PCIs may comprise cell measurements based on a first PCI and a second PCI.

In some examples, the cell measurements may be combined measurements of beams associated with the first PCI and the second PCI.

Figure 13:
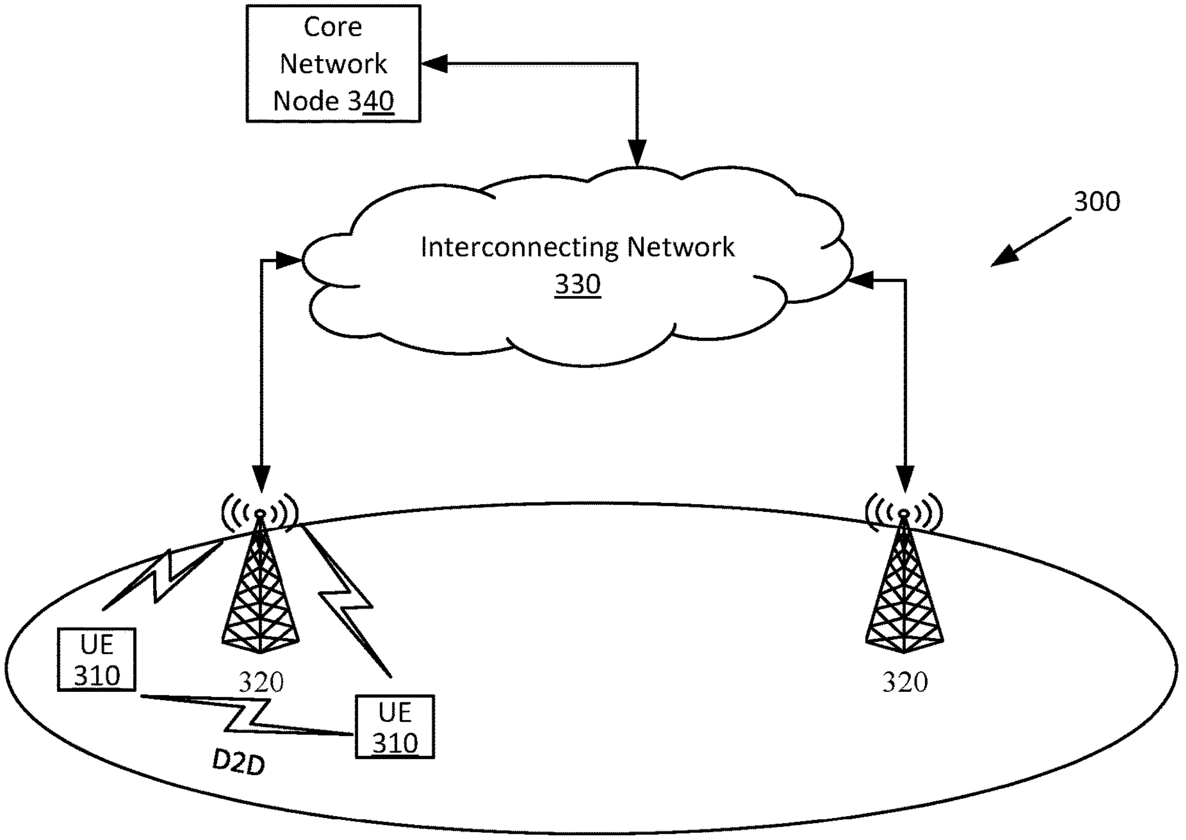
FIG. 13 illustrates one example of a wireless communications system in which embodiments of the present disclosure may be implemented.

FIG. 13 illustrates an example of a wireless network 300 that may be used for wireless communications. Wireless network 300 includes UEs 310 and a plurality of radio network nodes 320 (e.g., Node Bs (NBs) Radio Network Controllers (RNCs), evolved NBs (eNBs), next generation NB (gNBs), etc.) directly or indirectly connected to a core network 330 which may comprise various core network nodes. The network 300 may use any suitable radio access network (RAN) deployment scenarios, including Universal Mobile Telecommunication System (UMTS) Terrestrial Radio Access Network (UTRAN), and Evolved UMTS Terrestrial Radio Access Network (EUTRAN). UEs 310 may be capable of communicating directly with radio network nodes 320 over a wireless interface. In certain embodiments, UEs may also be capable of communicating with each other via device-to-device (D2D) communication. In certain embodiments, network nodes 320 may also be capable of communicating with each other, e.g. via an interface (e.g. X2 in LTE or other suitable interface).

As an example, UE 310 may communicate with radio network node 320 over a wireless interface and within a coverage. That is, UE 310 may transmit wireless signals to and/or receive wireless signals from radio network node 320. The wireless signals may contain voice traffic, data traffic, control signals, and/or any other suitable information.

In some embodiments, an area of wireless signal coverage associated with a radio network node 320 may be referred to as a cell.

It should be noted that a UE may be a wireless device, a radio communication device, target device, device to device (D2D) UE, machine type UE or UE capable of machine to machine communication (M2M), a sensor equipped with UE, iPAD, Tablet, mobile terminals, smart phone, laptop embedded equipped (LEE), laptop mounted equipment (LME), Universal Serial Bus (USB) dongles, Customer Premises Equipment (CPE) etc.

In some embodiments, the "network node" can be any kind of network node which may comprise of a radio network node such as a radio access node (which can include a base station, radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU), Remote Radio Head (RRH), a multi-standard BS (also known as MSR BS), etc.), a core network node (e.g., MME, SON node, a coordinating node, positioning node, MDT node, etc.), or even an external node (e.g., 3rd party node, a node external to the current network), etc. The network node may also comprise a test equipment.

In certain embodiments, network nodes 320 may interface with a radio network controller (not shown). The radio network controller may control network nodes 320 and may provide certain radio resource management functions, mobility management functions, and/or other suitable functions. In certain embodiments, the functions of the radio network controller may be included in the network node 320. The radio network controller may interface with the core network node 340. In certain embodiments, the radio network controller may interface with the core network node 340 via the interconnecting network 330.

The interconnecting network 330 may refer to any interconnecting system capable of transmitting audio, video, signals, data, messages, or any combination of the preceding. The interconnecting network 330 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 340 may manage the establishment of communication sessions and various other functionalities for wireless devices 310. Examples of core network node 340 may include MSC, MME, SGW, PGW, O&M, OSS, SON, positioning node (e.g. E-SMLC), MDT node, etc. Wireless devices 110 may exchange certain signals with the core network node 340 using the non-access stratum layer. In non-access stratum signaling, signals between wireless devices 310 and the core network node 340 may be transparently passed through the radio access network. In certain embodiments, network nodes 320 may interface with one or more other network nodes over an internode interface. For example, network nodes 320 may interface each other over an X2 interface.

Although FIG. 13 illustrates a particular arrangement of network 300, the present disclosure contemplates that the various embodiments described herein may be applied to a variety of networks having any suitable configuration. For example, network 300 may include any suitable number of wireless devices 310 and network nodes 320, as well as any additional elements suitable to support communication between wireless devices or between a wireless device and another communication device (such as a landline telephone). The embodiments may be implemented in any appropriate type of telecommunication system supporting any suitable communication standards and using any suitable components and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT), WiFi, Bluetooth, next generation RAT (NR, NX), 4G, 5G, LTE FDD/TDD, etc.

Figure 14:
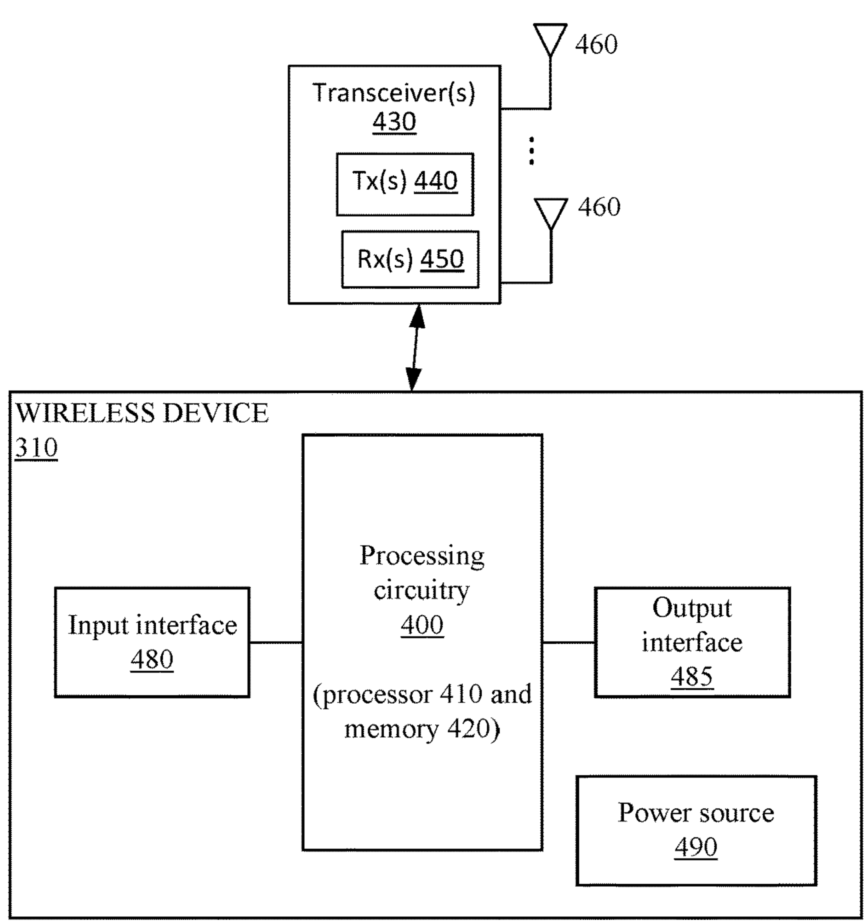
FIG. 14 is a block diagram illustrating a wireless device according to some embodiments.

FIG. 14 is a schematic block diagram of the wireless device 310 according to some embodiments of the present disclosure. As illustrated, the wireless device 310 includes circuitry 400 comprising one or more processors 410 (e.g., Central Processing Units (CPUs), Application Specific Integrated Circuits (ASICs), Field Programmable Gate Arrays (FPGAs), and/or the like) and memory 420. The wireless device 310 also includes one or more transceivers 430 each including one or more transmitters 440 and one or more receivers 450 coupled to one or more antennas 460. Furthermore, the processing circuitry 400 may be connected to an input interface 480 and an output interface 485. The input interface 480 and the output interface 485 may be referred to as communication interfaces. The wireless device 310 may further comprise power source 490.

In some embodiments, the functionality of the wireless device 310 described above may be fully or partially implemented in software that is, e.g., stored in the memory 420 and executed by the processor(s) 410. For example, the processor 410 is configured to perform all the functionalities performed by the wireless device 310, such as any steps of method 100 of FIG. 9 and method 150 of FIG. 10.

In some embodiments, a computer program including instructions which, when executed by the at least one processor 410, causes the at least one processor 410 to carry out the functionality of the wireless device 310 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 15:
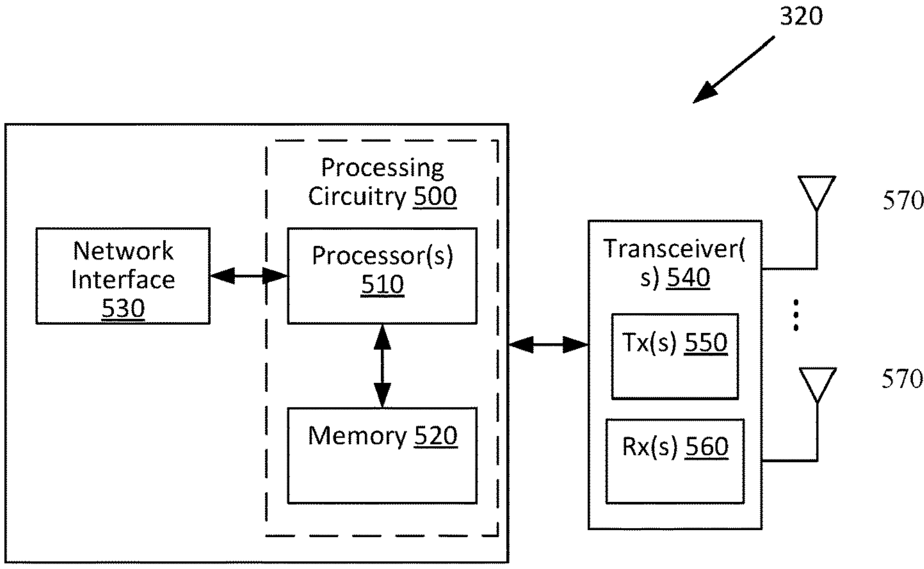
FIG. 15 is a block diagram illustrating a network node according to some embodiments.

FIG. 15 is a schematic block diagram of a network node 320 according to some embodiments of the present disclosure. As illustrated, the network node 320 includes a processing circuitry 500 comprising one or more processors 510 (e.g., CPUs, ASICs, FPGAs, and/or the like) and memory 520. The network node also comprises a network interface 530. The network node 320 also includes one or more transceivers 540 that each include one or more transmitters 550 and one or more receivers 560 coupled to one or more antennas 570. In some embodiments, the functionality of the network node 320 described above may be fully or partially implemented in software that is, e.g., stored in the memory 520 and executed by the processor(s) 510. For example, the processor 510 can be configured to perform any steps of the method 200 of FIG. 11 and method 250 of FIG. 12.

Figure 16:
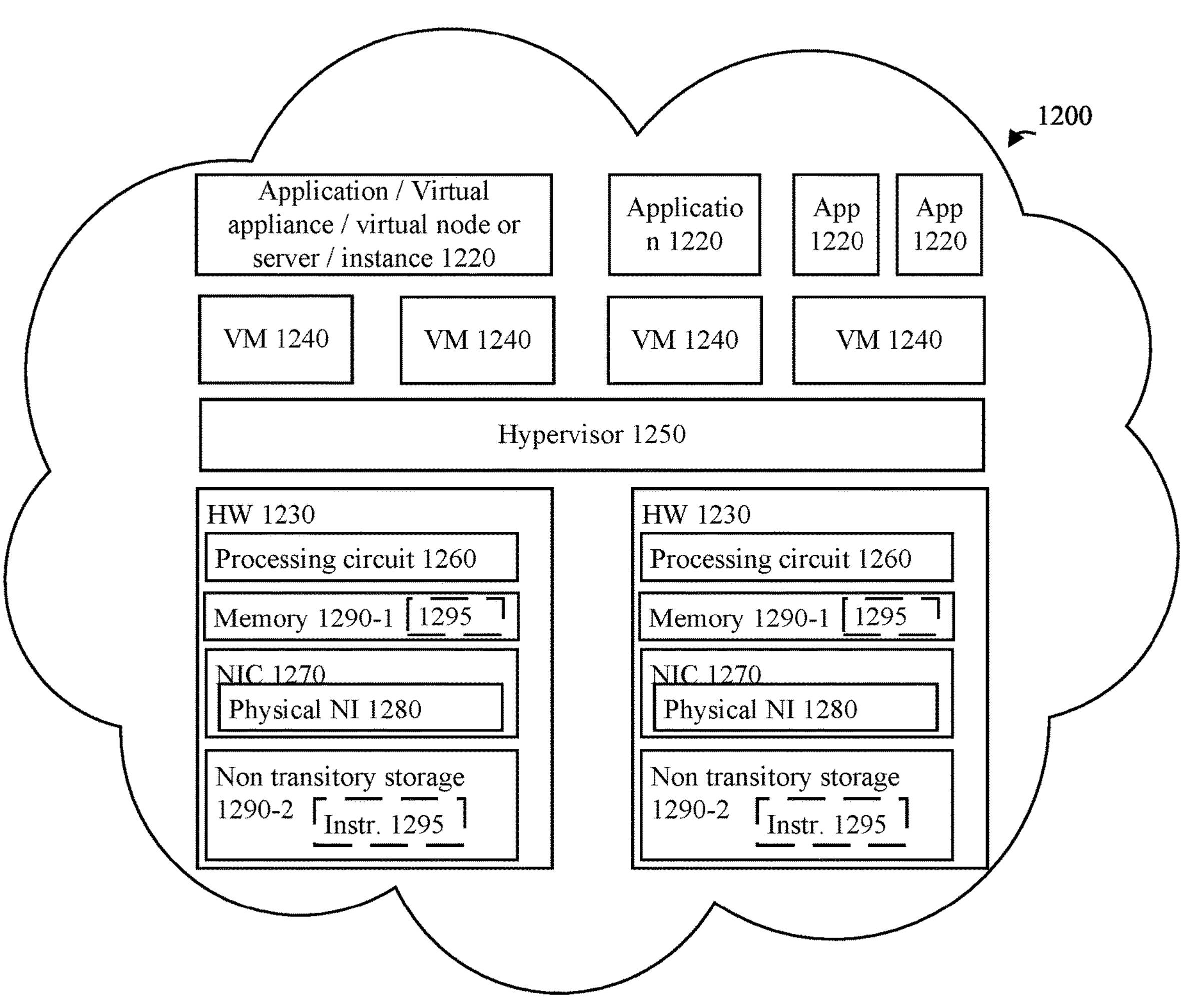
FIG. 16 illustrates a virtualized environment of a network node, according to some embodiments.

FIG. 16 is a schematic block diagram that illustrates a virtualized embodiment of the wireless device 310 or network node 320, according to some embodiments of the present disclosure. As used herein, a "virtualized" node 1200 is a network node 320 or wireless device 310 in which at least a portion of the functionality of the network node 320 or wireless device 310 is implemented as a virtual component (e.g., via a virtual machine(s) executing on a physical processing node(s) in a network(s)). For example, in FIG. 16, there is provided an instance or a virtual appliance 1220 implementing the methods or parts of the methods of some embodiments. The one or more instance(s) runs in a cloud computing environment 1200. The cloud computing environment provides processing circuits 1230 and memory 1290-1 for the one or more instance(s) or virtual applications 1220. The memory 1290-1 contains instructions 1295 executable by the processing circuit 1260 whereby the instance 1220 is operative to execute the methods or part of the methods described herein in relation to some embodiments.

The cloud computing environment 1200 comprises one or more general-purpose network devices including hardware 1230 comprising a set of one or more processor(s) or processing circuits 1260, which may be commercial off-the-shelf (COTS) processors, dedicated Application Specific Integrated Circuits (ASICs), or any other type of processing circuit including digital or analog hardware components or special purpose processors, and network interface controller(s) (NICs) 1270, also known as network interface cards, which include physical Network Interface 1280. The general-purpose network device also includes non-transitory machine readable storage media 1290-2 having stored therein software and/or instructions 1295 executable by the processor 1260. During operation, the processor(s)/processing circuits 1260 execute the software/instructions 1295 to instantiate a hypervisor 1250, sometimes referred to as a virtual machine monitor (VMM), and one or more virtual machines 1240 that are run by the hypervisor 1250.

A virtual machine 1240 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1240, and that part of the hardware 1230 that executes that virtual machine 1240, be it hardware 1230 dedicated to that virtual machine 1240 and/or time slices of hardware 1230 temporally shared by that virtual machine 1240 with others of the virtual machine(s) 1240, forms a separate virtual network element(s) (VNE).

The hypervisor 1250 may present a virtual operating platform that appears like networking hardware to virtual machine 1240, and the virtual machine 1240 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual application 1220 may be implemented on one or more of the virtual machine(s) 1240, and the implementations may be made differently.

In some embodiments, a carrier comprising the aforementioned computer program product is provided. The carrier is one of an electronic signal, an optical signal, a radio signal, or a computer readable storage medium (e.g., a non-transitory computer readable medium such as memory).

Some embodiments may be represented as a non-transitory software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to one or more of the described embodiments. Those of ordinary skill in the art will appreciate that other instructions and operations necessary to implement the described embodiments may also be stored on the machine-readable medium. Software running from the machine-readable medium may interface with circuitry to perform the described tasks. The above-described embodiments are intended to be examples only. Alterations, modifications and variations may be effected to the particular embodiments by those of skill in the art without departing from the scope of the description.

What is claimed is:

1. A method in a wireless device configured with multiple Physical Cell Identities (PCIs) for a mobility procedure, wherein the wireless device is configured with one or more cells operating in a same serving frequency, each cell associated with one or more PCIs, the method comprising:
- selecting a PCI among the multiple PCIs;
- determining cell measurement results based on cell measurements performed on the selected PCI, wherein the cell measurements represent measurements of a serving cell, wherein determining the cell measurement results comprises deriving one or more cell measurement quantities based on Synchronization Signal (SS)/Physical Broadcast Channel (PBCH) block(s) encoding the selected PCI; and
- determining whether or not to trigger an event for measurement reporting, based on the cell measurement results.

2. The method of claim 1, wherein the mobility procedure is at least one of a change and activation of a cell or a PCI by the wireless device upon receipt of at least one of Layer 1 (L1) signaling and Layer 2 (L2) signaling.

3. The method of claim 2, wherein the L1 signaling comprises a downlink Control information (DCI) and the L2 signaling comprises a Medium Access Control (MAC) Control Element (CE).

4. The method of claim 1, wherein selecting the PCI comprises selecting a PCI of a cell with which the wireless device transitioned to a connected state and/or a cell to which the wireless device is handed over and/or a cell for which the wireless device receives the configuration for the mobility procedure.

5. The method of claim 1, further comprising receiving a message indicating a change of PCI among the multiple PCIs, wherein the indication of change is from a first PCI to a second PCI, and wherein selecting the PCI comprises selecting the second PCI.

6. The method of claim 5, wherein the second PCI is associated with a same cell as the first PCI or is different from a cell associated with the first PCI.

7. The method of claim 5, wherein performing the cell measurements based on the selected PCI comprises performing cell measurements based on the second PCI.

8. The method of claim 7, further comprising stopping performing cell measurements based on the first PCI.

9. The method of claim 7, further comprising blacklisting the rest of the PCIs in the multiple PCIs, wherein blacklisting the rest of the PCIs comprises one or more of i) not performing cell measurements on the rest of the PCIs and ii) not triggering event for measurement reporting based on the cell measurements on the rest of the PCIs.

10. The method of claim 1, wherein each cell measurement quantity based on SS/PBCH block(s) encoding the selected PCI comprises a highest beam measurement quantity value.

11. The method of claim 1, wherein each cell measurement quantity based on SS/PBCH block(s) encoding the selected PCI comprises an average of a highest beam measurement quantity values above a threshold, wherein a total number of averaged beams shall not exceed a maximum number.

12. The method of claim 1, wherein the cell measurement quantity comprises one or more of a Reference Signal Received Power (RSRP), a Reference Signal Received Quality (RSRQ) and a Signal-to-Noise-plus-Interference Ratio (SINR).

13. A method in a network node, the method comprising:
- sending a configuration to a wireless device for configuring the wireless device with multiple Physical Cell Identities (PCIs) for a mobility procedure, wherein the wireless device is configured with one or more cells operating in a same serving frequency, each cell being associated with one or more PCIs; and
- receiving a report including cell measurements performed based on a PCI selected among the multiple PCIs, wherein the cell measurements represent measurements of a serving cell, and wherein the cell measurement results comprise one or more cell measurement quantities derived based on Synchronization Signal (SS)/Physical Broadcast Channel (PBCH) block(s) encoding the selected PCI.

14. The method of claim 13, wherein the mobility procedure is at least one of a change and activation of a cell or a PCI by the wireless device upon receipt of at least one of Layer 1 (L1) signaling and Layer 2 (L2) signaling.

15. The method of claim 14, wherein the L1 signaling comprises a downlink Control information (DCI) and the L2 signaling comprises a Medium Access Control (MAC) Control Element (CE).

16. The method of claim 13, wherein the selected PCI is associated with a cell with which the wireless device transitioned to a connected state and/or a cell to which the wireless device is handed over and/or a cell for which the wireless device receives the configuration for the mobility procedure.

17. The method of claim 13, further comprising sending a message indicating a change of PCI between the multiple PCIs, wherein the indication of change is from a first PCI to a second PCI.

18. The method of claim 17, wherein the second PCI is associated with a same cell as the first PCI or is different from a cell associated with the first PCI.

19. A wireless device configured with multiple Physical Cell Identities (PCIs) for a mobility procedure, and with one or more cells operating in a same serving frequency, each cell associated with one or more PCIs, the wireless device comprising a communication interface and processing circuitry connected thereto and configured to:
- select a PCI among the multiple PCIs;
- determine cell measurement results based on cell measurements performed on the selected PCI, wherein the cell measurements represent measurements of a serving cell, wherein determining the cell measurement results comprises deriving one or more cell measurement quantities based on Synchronization Signal (SS)/Physical Broadcast Channel (PBCH) block(s) encoding the selected PCI; and
- determine whether or not to trigger an event for measurement reporting, based on the cell measurement results.

* * * * *